US011651094B2

(12) United States Patent
Nimura et al.

(10) Patent No.: US 11,651,094 B2
(45) Date of Patent: *May 16, 2023

(54) COMMUNICATION CONTROL DEVICE, DATA SECURITY SYSTEM, COMMUNICATION CONTROL METHOD, AND COMPUTER PRODUCT

(71) Applicant: FUJITSU LIMITED, Kawasaki (JP)

(72) Inventors: Kazuaki Nimura, Kawasaki (JP); Yousuke Nakamura, Kawasaki (JP); Kouichi Yasaki, Kawasaki (JP); Fumio Honda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/982,943

(22) Filed: Dec. 29, 2015

(65) Prior Publication Data
US 2016/0132689 A1 May 12, 2016

Related U.S. Application Data

(62) Division of application No. 12/500,307, filed on Jul. 9, 2009, now Pat. No. 9,262,650.

(30) Foreign Application Priority Data

Jul. 24, 2008 (JP) .............................. JP2008-191347
May 11, 2009 (JP) .............................. JP2009-114256

(51) Int. Cl.
*G06F 21/62* (2013.01)
*H04W 12/08* (2021.01)
(Continued)

(52) U.S. Cl.
CPC ........ *G06F 21/6218* (2013.01); *G06F 1/3296* (2013.01); *G06F 21/88* (2013.01);
(Continued)

(58) Field of Classification Search
None
See application file for complete search history.

(56) References Cited

U.S. PATENT DOCUMENTS 5,689,715 A * 11/1997 Crump .................. G06F 1/3209
713/502
5,748,084 A * 5/1998 Isikoff ...................... G01S 5/04
340/5.74

(Continued)

FOREIGN PATENT DOCUMENTS

JP          8-272742      10/1996
JP       2000-138698       5/2000
(Continued)

OTHER PUBLICATIONS

Vichare et al (Prognostics and Health Management of Electronics) (Year: 2006).*

(Continued)

*Primary Examiner* — Mamon Obeid
(74) *Attorney, Agent, or Firm* — Staas & Halsey LLP

(57) ABSTRACT

A communication control device configured to access an information processing apparatus in which data is stored. The device and method acquires an operational condition of an information processing apparatus, and notifies the information processing apparatus of a security command for causing the information processing apparatus to execute a security process on the data in an event that an operational condition is activated and, in an event that the operational condition is a standby mode, a hibernate mode, or a shutdown mode, notifies the information processing apparatus of an activation command for activating the information processing apparatus, and notifies of a security command for causing the information processing apparatus to execute a security process on the data.

15 Claims, 26 Drawing Sheets

(51) Int. Cl.
| | |
|---|---|
| *H04W 12/082* | (2021.01) |
| *H04W 12/126* | (2021.01) |
| *G06F 21/88* | (2013.01) |
| *G06F 1/3296* | (2019.01) |
| *H04L 9/06* | (2006.01) |
| *G06F 1/3293* | (2019.01) |
| *G06F 21/60* | (2013.01) |
| *H04W 8/22* | (2009.01) |
| *H04W 12/04* | (2021.01) |
| *H04W 12/02* | (2009.01) |

(52) U.S. Cl.
CPC .......... *H04L 9/0618* (2013.01); *H04W 12/08* (2013.01); *H04W 12/082* (2021.01); *H04W 12/126* (2021.01); *G06F 1/3293* (2013.01); *G06F 21/602* (2013.01); *G06F 21/62* (2013.01); *G06F 2221/2143* (2013.01); *H04L 2209/24* (2013.01); *H04W 8/22* (2013.01); *H04W 12/02* (2013.01); *H04W 12/04* (2013.01)

(56) References Cited

U.S. PATENT DOCUMENTS

| | | | | |
|---|---|---|---|---|
| 5,796,940 | A * | 8/1998 | Nagashima | G06F 21/121 711/163 |
| 5,910,964 | A * | 6/1999 | Sugita | H04B 1/708 370/208 |
| 5,944,828 | A * | 8/1999 | Matsuoka | G06F 1/32 713/323 |
| 5,978,912 | A * | 11/1999 | Rakavy | G06F 9/4416 713/2 |
| 6,154,846 | A * | 11/2000 | Arai | G06F 1/3203 713/323 |
| 6,175,784 | B1 * | 1/2001 | Jicha | B61L 3/125 701/19 |
| 6,225,708 | B1 * | 5/2001 | Furukawa | G06F 1/305 307/66 |
| 6,308,243 | B1 * | 10/2001 | Kido | G06F 9/526 711/147 |
| 6,333,684 | B1 * | 12/2001 | Kang | G06F 21/83 340/7.2 |
| 6,567,931 | B1 * | 5/2003 | Jue | G06F 1/24 713/310 |
| 6,741,851 | B1 * | 5/2004 | Lee | H04M 1/67 455/410 |
| 6,798,355 | B2 * | 9/2004 | Flick | B60R 25/04 340/989 |
| 6,892,225 | B1 * | 5/2005 | Tu | H04L 12/2856 709/219 |
| 7,167,993 | B1 * | 1/2007 | Thomas | G06F 1/324 713/322 |
| 7,367,059 | B2 * | 4/2008 | Hurst | G06F 21/10 726/26 |
| 7,543,144 | B2 * | 6/2009 | Rensin | G06F 21/313 713/164 |
| 7,809,956 | B2 * | 10/2010 | Ebihara | H04H 60/23 713/193 |
| 7,809,961 | B2 * | 10/2010 | Dahan | G06F 1/3237 455/574 |
| 7,865,172 | B2 * | 1/2011 | Blair | G06F 21/6218 455/26.1 |
| 7,895,662 | B1 * | 2/2011 | Scales | G06F 21/6218 726/27 |
| 8,078,229 | B2 * | 12/2011 | Tetsuhashi | G06F 3/0482 455/566 |
| 8,099,100 | B2 * | 1/2012 | Yamada | H04M 3/42289 455/450 |
| 8,145,192 | B2 * | 3/2012 | Tanae | H04M 19/04 455/411 |
| 8,145,892 | B2 * | 3/2012 | Bhansali | G06F 21/572 713/2 |
| 8,260,320 | B2 * | 9/2012 | Herz | H04M 3/42348 455/456.2 |
| 8,270,971 | B2 * | 9/2012 | Akama | H04L 63/102 709/227 |
| 8,359,643 | B2 * | 1/2013 | Low | H04L 9/40 370/254 |
| 8,384,523 | B1 * | 2/2013 | Rodriquez | G06K 7/10009 340/5.1 |
| 8,495,704 | B2 * | 7/2013 | Nimura | G06F 21/88 713/340 |
| 8,538,412 | B2 * | 9/2013 | Yokoyama | H04W 28/085 455/422.1 |
| 8,543,090 | B2 * | 9/2013 | Yasuda | H04M 1/72412 713/168 |
| 8,621,644 | B2 * | 12/2013 | Chan | G06F 21/79 726/26 |
| 8,660,530 | B2 * | 2/2014 | Sharp | H04L 67/125 455/565 |
| 8,799,526 | B2 * | 8/2014 | Cho | H04L 12/12 710/14 |
| 9,015,509 | B2 * | 4/2015 | Kim | G06F 1/3293 713/323 |
| 9,049,468 | B2 * | 6/2015 | Ikezoye | G06Q 20/367 |
| 9,084,143 | B2 * | 7/2015 | Rubin | H04W 28/06 |
| 9,107,094 | B2 * | 8/2015 | Rubin | H04W 36/0033 |
| 9,262,650 | B2 * | 2/2016 | Nimura | G06F 1/3296 |
| 10,127,802 | B2 * | 11/2018 | Raji | G06F 1/263 |
| 2002/0156983 | A1 * | 10/2002 | Jones | G06F 11/1441 711/143 |
| 2002/0174353 | A1 * | 11/2002 | Lee | G06F 21/575 713/193 |
| 2002/0178242 | A1 * | 11/2002 | Eda | H04L 67/34 709/222 |
| 2003/0003874 | A1 * | 1/2003 | Nitta | H04W 72/082 455/67.11 |
| 2004/0015941 | A1 * | 1/2004 | Sekine | G06F 8/65 717/168 |
| 2004/0025053 | A1 * | 2/2004 | Hayward | G06F 21/6245 709/217 |
| 2004/0070994 | A1 * | 4/2004 | Takagi | H02M 3/33592 363/16 |
| 2004/0243734 | A1 * | 12/2004 | Kitagawa | G06F 21/78 710/13 |
| 2004/0268073 | A1 | 12/2004 | Morisawa | |
| 2006/0129789 | A1 * | 6/2006 | Chu | G06F 9/4403 713/1 |
| 2006/0234679 | A1 * | 10/2006 | Matsumoto | H04M 3/382 455/411 |
| 2006/0278701 | A1 * | 12/2006 | Matsushita | G06F 21/31 235/382 |
| 2007/0006154 | A1 * | 1/2007 | Yang | G06F 11/3636 717/124 |
| 2007/0066326 | A1 * | 3/2007 | Agarwal | H04W 4/12 455/466 |
| 2007/0075728 | A1 * | 4/2007 | Chang | G06F 1/26 324/764.01 |
| 2007/0077925 | A1 * | 4/2007 | Hiyama | H04M 1/66 455/414.1 |
| 2007/0106723 | A1 * | 5/2007 | Nakamura | H04N 21/439 709/203 |
| 2007/0113111 | A1 * | 5/2007 | Dahan | G06F 1/3228 713/300 |
| 2007/0281664 | A1 * | 12/2007 | Kaneko | H04W 8/245 455/410 |
| 2008/0005783 | A1 * | 1/2008 | Polzin | H04W 12/06 726/4 |
| 2008/0028477 | A1 * | 1/2008 | Lehmann | H01M 8/2475 726/36 |
| 2008/0034224 | A1 | 2/2008 | Ferren et al. | |
| 2008/0183305 | A1 * | 7/2008 | Foster | G06F 21/85 700/3 |
| 2008/0305770 | A1 * | 12/2008 | Kasama | H04W 12/12 455/411 |
| 2009/0075630 | A1 * | 3/2009 | Mclean | H04L 63/0428 455/410 |

(56) References Cited

U.S. PATENT DOCUMENTS

| | | | | |
|---|---|---|---|---|
| 2009/0089887 | A1* | 4/2009 | Aissi | G06F 21/88 |
| | | | | 726/35 |
| 2009/0112884 | A1* | 4/2009 | Sathath | G06F 3/0625 |
| 2009/0248827 | A1 | 10/2009 | Hazra et al. | |
| 2010/0023744 | A1* | 1/2010 | Markel | G06F 21/85 |
| | | | | 713/2 |
| 2010/0024040 | A1* | 1/2010 | Nimura | G06F 1/3296 |
| | | | | 726/26 |
| 2010/0060425 | A1* | 3/2010 | Rodriguez | H04Q 9/00 |
| | | | | 340/10.1 |
| 2010/0115296 | A1* | 5/2010 | Inoue | G06F 1/266 |
| | | | | 713/300 |
| 2010/0169554 | A1* | 7/2010 | Nakamura | G06F 21/88 |
| | | | | 711/E12.008 |
| 2010/0169678 | A1* | 7/2010 | Kozuka | G06F 1/3221 |
| | | | | 713/323 |
| 2010/0202161 | A1* | 8/2010 | Sims | H02M 7/02 |
| | | | | 363/20 |
| 2011/0018692 | A1* | 1/2011 | Smith | H04L 1/201 |
| | | | | 340/10.4 |
| 2011/0098030 | A1* | 4/2011 | Luoma | H04W 4/50 |
| | | | | 455/435.1 |
| 2011/0119149 | A1* | 5/2011 | Ikezoye | H04N 7/17318 |
| | | | | 705/26.7 |
| 2011/0161660 | A1* | 6/2011 | Zhang | H04L 63/0869 |
| | | | | 708/250 |
| 2011/0213899 | A1* | 9/2011 | Guo | G06F 21/88 |
| | | | | 710/7 |
| 2012/0079295 | A1* | 3/2012 | Hayek | G06F 1/3265 |
| | | | | 713/310 |
| 2012/0117311 | A1* | 5/2012 | Hong | G06F 12/0246 |
| | | | | 711/E12.008 |
| 2014/0337454 | A1* | 11/2014 | Yamamoto | H04N 21/25875 |
| | | | | 709/208 |
| 2015/0088278 | A1* | 3/2015 | Chang | H04W 52/02 |
| | | | | 700/40 |
| 2015/0160711 | A1* | 6/2015 | Zhu | G06F 1/3209 |
| | | | | 713/323 |
| 2016/0132689 | A1* | 5/2016 | Nimura | G06F 21/88 |
| | | | | 726/1 |

FOREIGN PATENT DOCUMENTS

| | | |
|---|---|---|
| JP | 2001-166853 | 6/2001 |
| JP | 2002-351668 | 12/2002 |
| JP | 2004-102408 | 4/2004 |
| JP | 2005-18415 | 1/2005 |
| JP | 2006-287503 | 10/2006 |
| JP | 2006-303817 | 11/2006 |
| JP | 2007-74704 | 3/2007 |
| JP | 2007-172634 | 7/2007 |
| JP | 2007-328462 | 12/2007 |
| JP | 2008-167381 | 7/2008 |
| JP | 2009-225161 | 10/2009 |
| WO | 2008/005082 A2 | 1/2008 |

OTHER PUBLICATIONS

Japanese Office Action dated Sep. 30, 2014 in corresponding Japanese Patent Application No. 2013-231927.

Japanese Office Action for Patent Application No. 2013-186130 dated Jul. 1, 2014.

Japanese Office Action dated Jul. 9, 2013 in corresponding Japanese Application No. 2009-114256.

Business Convenience Pack, address book data deletion function, KDDI, www.kddi.com/business/pr/security/address/index2.html, Jul. 7, 2008.

OmakaseLock,NTTdocomo,www.nttdocomo.co.jp/service/anshin/lock/, Jul. 7, 2008.

Restriction Requirement issued in copending U.S. Appl. No. 12/500,307 dated Apr. 30, 2012.

Office Action issued in copending U.S. Appl. No. 12/500,307 dated Jul. 27, 2012.

Office Action issued in copending U.S. Appl. No. 12/500,307 dated Dec. 31, 2012.

Office Action issued in copending U.S. Appl. No. 12/500,307 dated Aug. 22, 2014.

Office Action issued in copending U.S. Appl. No. 12/500,307 dated Mar. 6, 2015.

Notice of Allowance issued in copending U.S. Appl. No. 12/500,307 dated Oct. 8, 2015 .

U.S. Appl. No. 12/500,307, filed Jul. 9, 2009, Nimura, Kazuaki, et al., Fujitsu Limited.

Japanese Office Action dated Apr. 25, 2017 in corresponding Japanese Patent Application No. 2015-256394.

Osamu Nakamichi, "Shock of a vPro, Real Value of Vista. The $3^{rd}$ time the personal computer from a remote place so that a lock is possible", Nikkei Business Publications, Mar. 28, 2007, 4 pages, retrieved from URL: http://itpro.nikkeibp.co.jp/article/COLUMN/20070309/264449/?rt=nocnt on Apr. 11, 2017**.

Hirota Yoichi, "Corporate network current of the next-generation client to revolutionize, The $3^{rd}$ vPro(2) core technology embeds work of IT section at a control mechanism and virtual PC", Nikkei Communication, No. 473, Nikkei Business Publications, Nov. 1, 2006, Japan, pp. 120-125**.

Japanese Office Action dated Nov. 29, 2016 in corresponding Japanese Patent Application No. 2015-256394.

Japanese Office Action dated Nov. 28, 2017 in corresponding Japanese Patent Application No. 2015-256394.

Office Action of Japanese Patent Application No. 2018-034596 dated Oct. 2, 2018.

"Express5800/BladeServer Management Software", NEC technical report, vol. 55, No. 7, p. 62-67, NEC Corporation, Jul. 25, 2002, Japan.

Japanese Report of Reconsideration by Examiner before Appeal dated May 8, 2018 in Japanese Patent Application No. 2015-256394.

Japanese Office Action dated Apr. 16, 2019 in Japanese Patent Application No. 2018-034596.

* cited by examiner

FIG. 4

| OPERATIONAL CONDITION OF INFORMATION PROCESSING APPARATUS | NOTIFICATION COMMAND |
|---|---|
| S0 TO S2 (ACTIVATED CONDITION) | "INTERRUPT" |
| S3 (STANDBY MODE) | "PME" |
| S4 (HIBERNATE MODE) | "PME" |
| S5 (SHUTDOWN MODE) | "PME" |

FIG. 5

| OPERATIONAL CONDITION OF INFORMATION PROCESSING APPARATUS | DELETION RANGE |
|---|---|
| S0 TO S2 (ACTIVATED CONDITION) | HDD (WHOLE), RAM |
| S3 (STANDBY MODE) | HDD (CIPHER KEY), RAM |
| S4 (HIBERNATE MODE) | HDD (CIPHER KEY) |
| S5 (SHUTDOWN MODE) | HDD (CIPHER KEY) |

FIG. 12

| OPERATIONAL CONDITION OF INFORMATION PROCESSING APPARATUS | DELETION RANGE |
|---|---|
| S0 TO S2 (ACTIVATED CONDITION) | HDD (WHOLE), RAM |
| S3 (STANDBY MODE) | HDD (CIPHER KEY), RAM |
| S4 (HIBERNATE MODE) | HDD (CIPHER KEY) |
| S5 (SHUTDOWN MODE) | CIPHER KEY RECORDING SECTION |

FIG. 16

| OPERATIONAL CONDITION OF INFORMATION PROCESSING APPARATUS | NOTIFICATION COMMAND |
|---|---|
| S0 TO S2 (ACTIVATED CONDITION) | "RESET" |
| S3 (STANDBY MODE) | "PME" |
| S4 (HIBERNATE MODE) | "PME" |
| S5 (SHUTDOWN MODE) | "PME" |

COMMUNICATION CONTROL DEVICE, DATA SECURITY SYSTEM, COMMUNICATION CONTROL METHOD, AND COMPUTER PRODUCT

CROSS-REFERENCE TO RELATED APPLICATIONS

This application is a divisional of U.S. application Ser. No. 12/500,307, filed Jul. 9, 2009, now pending, which in turn was based upon and claims the benefit of priority from Japanese Patent Application No. 2008-191347 filed on Jul. 24, 2008, and Japanese Patent Application No. 2009-114256 filed on May 11, 2009, which is herein incorporated by reference in its entirety.

BACKGROUND

1. Field

The present invention relates to a communication control device which can access an information processing apparatus, a data security system, a communication control method, and a computer-readable medium having a program, and in particular, relates to a communication control device, data security system, communication control method, and program configured to notify the information processing apparatus of various kinds of command.

2. Description of the Related Art

In recent years, a portable telephone includes not only a telephoning function, but also function(s) with which it is possible to browse a web site by connecting to the Internet, and to transmit and receive electronic mail.

In particular, in recent years, transformation of the portable telephone into an Internet terminal is proceeding at a tremendous pace, the portable telephone includes an electronic money function, a camera function, a television function, an application software execution function, and the like.

The portable telephone, exceeding the confines of the Internet terminal, is evolving into an instrument which includes a function as a personal digital assistant (PDA).

Accompanying the increase in function(s) of the portable telephone, a large capacity memory is mounted in the portable telephone.

For this reason, an owner of the portable telephone can register, in an address book, information (an address, a telephone number, and the like) of a large number of parties in a directory, and save a large number of mails and images (moving images and still images).

As this kind of portable telephone is primarily used in a mobile environment, it often happens that it is stolen or lost.

For example, in the event that a portable telephone is lost, and the portable telephone is found by a third party, it may happen that various kinds of data, such as personal data, business data, and important data, stored in the portable telephone are acquired by the third party.

Therein, a service which locks the portable telephone in the event that the portable telephone is stolen or lost is being provided by a communication carrier (Omakase Lock, [online], NTT docomo, [Jul. 7, 2008 search], Internet, <URL: http://www.nttdocomo.co.jp/service/anshin/lock/>.

Also, a service which deletes the data stored in the portable telephone in the event that the portable telephone is stolen or lost is also being provided by a communication carrier (Business Convenience Pack, address book data deletion function, [online], KDDI, [Jul. 7, 2008 search], Internet, <URL:http://www.kddi.com/business/pr/security/address/index.html>.

In order to realize these kinds of services, the following configurations are included in the portable telephone.

Specifically, a reception section which receives a remote control packet transmitted from a server apparatus, an identification section which determines whether or not a security process request command is included in the remote control packet, and a security section which, in the event that a security process request command is included in the remote control packet, carries out a security process on the data stored in the portable telephone, are included in the portable telephone (refer to JP-A-2006-303817).

Herein, the server apparatus, generally, is an apparatus belonging to the communication carrier.

That is, the owner of the portable telephone communicates the fact that the portable telephone has been stolen or lost to an operator of the communication carrier, by means of a telephone or the like.

Then, in the event that the identity of the owner of the portable telephone who has made the communication is confirmed by the operator, the operator instructs the server apparatus in such a way that a remote control packet is transmitted to the portable telephone.

By this means, the portable telephone can carry out a security process on the data stored in the portable telephone.

SUMMARY

A communication control device and method disclosed hereafter, is configured to access an information processing apparatus in which data is stored. The device includes an operational condition acquisition section which acquires an operational condition of the information processing apparatus, and a command notification section which, in an event that the operational condition is an activated condition, notifies the information processing apparatus of a security command for causing the information processing apparatus to execute a security process on the data and, in an event that the operational condition is a standby mode, a hibernate mode, or a shutdown mode, notifies the information processing apparatus of an activation command for activating the information processing apparatus, and of a security command for causing the information processing apparatus to execute a security process on the data.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 illustrates an example of data recorded in a command recording section of a communication control device;

FIG. 5 illustrates an example of data recorded in a deletion range recording section of a communication control device;

FIG. 12 illustrates an example of data recorded in a deletion range recording section of a communication control device;

FIG. 16 illustrates an example of data recorded in a command recording section of an information processing apparatus;

DETAILED DESCRIPTION OF EMBODIMENTS

Figure 1:
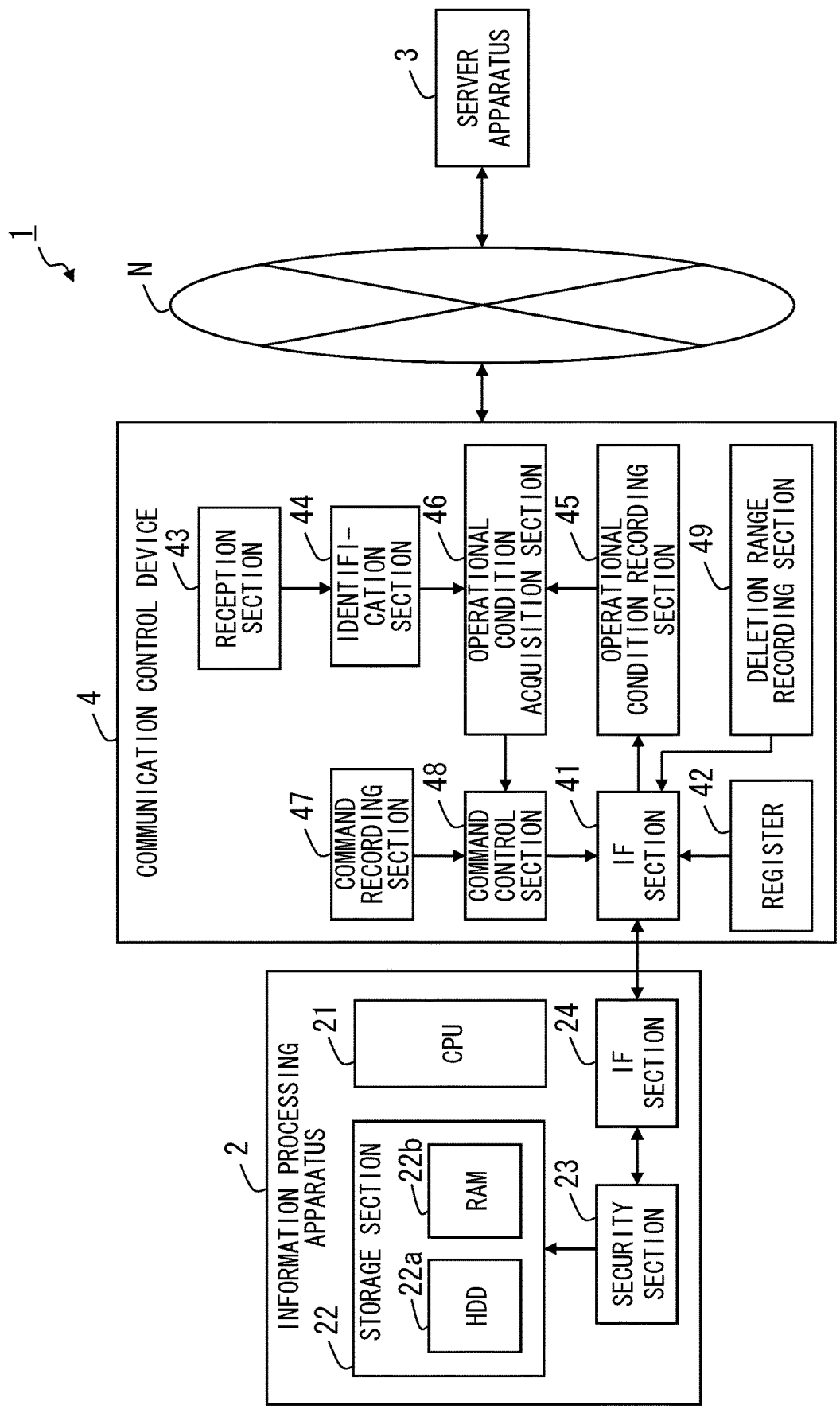
FIG. 1 illustrates an outline configuration of a data security system according to an embodiment of the invention.

Reference will now be made in detail to the embodiments, examples of which are illustrated in the accompanying drawings, wherein like reference numerals refer to the like elements throughout. The embodiments are described below to explain the present invention by referring to the figures.

Cases of theft or loss of information processing apparatus, such as a general purpose personal computer, are increasing.

That is, this is because in recent years, for example, personal computers or device(s) which can be easily carried around, such as a laptop computer, are spreading.

For this reason, it is desirable that, as with a portable telephone, a security process can be carried out in the personal computer too in the case of theft or loss.

However, a system has not been satisfactorily established which can realize in the personal computer the same kind of process as the security process in the portable telephone.

Herein, even supposing that the personal computer is equipped with the same kind of function as a security section with which the portable telephone is equipped, and that a communication control device which can receive a remote control packet transmitted from the server apparatus is mounted in the personal computer, it has not been possible to carry out the security process in the personal computer for the following reason.

That is, the personal computer may normally flit among an activated condition, a standby mode, a hibernate mode, and a shutdown mode as its operational condition.

In the event that the operational condition of the personal computer is the standby mode, the hibernate mode, or the shutdown mode, it is necessary to temporarily shift the operational condition of the personal computer to the activated condition, but the communication control device is not equipped with a function which notifies the personal computer of an activation command for activating the personal computer, and of a security command for causing the personal computer to execute a security process.

Also, even in the event that the operational condition of the personal computer is the activated condition, the communication control device is not equipped with a function which notifies the personal computer of a security command for causing the personal computer to execute a security process.

For this reason, even supposing that the personal computer is equipped with a security section, it is not possible to satisfactorily carry out in the personal computer the same kind of process as the security process in the portable telephone.

The system disclosed hereafter can cause an information processing apparatus to execute a security process, regardless of an operational condition of an information processing apparatus.

A communication control device according to one embodiment of the invention, is capable of accessing an information processing apparatus in which data is stored, includes an operational condition acquisition section which acquires an operational condition of the information processing apparatus, and a command notification section which, in an event that the operational condition is an activated condition, notifies the information processing apparatus of a security command for causing the information processing apparatus to execute a security process on the data and, in an event that the operational condition is a standby mode, a hibernate mode, or a shutdown mode, notifies the information processing apparatus of an activation command for activating the information processing apparatus, and of a security command for causing the information processing apparatus to execute a security process on the data.

A data security system, a communication control method, and a program (computer product) which express essentially the same technical idea are also embodiment(s) of the invention.

According to the heretofore described configuration, the operational condition acquisition section acquires the operational condition of the information processing apparatus.

Then, the command notification section, in the event that the operational condition is the activated condition, notifies the information processing apparatus of the security command for causing the information processing apparatus to execute a security process on the data.

Also, the command notification section, in the event that the operational condition is the standby mode, hibernate mode, or shutdown mode, notifies the information processing apparatus of the activation command for activating the information processing apparatus, and of the security command for causing the information processing apparatus to execute a security process on the data.

By this means, it is possible to cause the information processing apparatus to execute a security process, regardless of the operational condition of the information processing apparatus.

In an embodiment of the invention, it is preferable to configure in such a way that the information processing apparatus includes a first ID recording section in which first ID is recorded, the communication control device includes a second ID recording section in which second ID is recorded, and the information processing apparatus further includes a legitimacy confirmation section which determines, by comparing the first ID recorded in the first ID recording section and the second ID recorded in the second ID recording section, whether or not the ID match each other and, in the event of determining that the ID do not match each other, discards the command notified of by the command notification section.

According to this configuration, in an event that the communication control device is not a legitimate communication control device, the legitimacy confirmation section of the information processing apparatus can discard the command notified of by the command notification section included in the communication control device.

In an embodiment of the invention, it is preferable to configure in such a way that, the security process being a process which deletes the data stored in the information processing apparatus, the communication control device further includes a deletion range recording section which correlates and records the operational condition of the information processing apparatus and a deletion range of the data, and the information processing apparatus, in an event of receiving the security command notified of by the command notification section, deletes data within a deletion range correlated to the operational condition of the information processing apparatus acquired by the operational condition acquisition section, by referring to the deletion range recording section.

According to this configuration, the information processing apparatus, in the event of receiving the security command notified of by the command notification section, can delete the data within the deletion range correlated to the operational condition of the information processing apparatus acquired by the operational condition acquisition section.

In an embodiment of the invention, it is preferable to configure in such a way that the information processing apparatus further includes an encoding execution section which, by using a cipher key, encodes the data stored in the information processing apparatus, the encoding execution section records the cipher key used in the encoding of the data in a cipher key recording section included in the communication control device, and the communication control device further includes a cipher key deletion section which, by referring to the deletion range recording section, deletes the cipher key recorded in the cipher key recording section in the event that the data deletion range correlated to the operational condition of the information processing apparatus acquired by the operational condition acquisition section indicates the cipher key recorded in the cipher key recording section.

According to this configuration, in the event that, in the deletion range recording section, the data deletion range correlated to the operational condition of the information processing apparatus acquired by the operational condition acquisition section indicates the cipher key recorded in the cipher key recording section, the cipher key deletion section can delete the cipher key recorded in the cipher key recording section included in the communication control device.

By this means, it is possible to execute a security process without requiring the command notification section of the communication control device to notify the information processing apparatus of a command.

The information processing apparatus according to an embodiment of the invention, being an information processing apparatus in which data is stored, is provided in such a way as to be accessible from the communication control device, and includes an operational condition acquisition section which, on a given signal being received from the communication control device, acquires an operational condition of the information processing apparatus, and a command control section which, in an event that the operational condition is an activated condition, causes the information processing apparatus to execute a security process on the data and, in the event that the operational condition is a standby mode, a hibernate mode, or a shutdown mode, causes the information processing apparatus to execute an activation command for activating the information processing apparatus, and to execute a security process on the data.

According to the heretofore described configuration, the operational condition acquisition section acquires the operational condition of the information processing apparatus. Then, the command notification section, in the event that the operational condition is the activated condition, notifies the information processing apparatus of a security command for causing the information processing apparatus to execute a security process on the data. Also, the command notification section, in the event that the operational condition is the standby mode, hibernate mode, or shutdown mode, notifies the information processing apparatus of an activation command for activating the information processing apparatus, and of a security command for causing the information processing apparatus to execute a security process on the data. By this means, it is possible to cause the information processing apparatus to execute a security process, regardless of the operational condition of the information processing apparatus.

In an embodiment of the invention, the communication control device includes a determination section which, in an event that a residual power acquired from the information processing apparatus is of a given value or less, records a security command and/or an activation command in a recording section, and in an event that the residual power exceeds the given value, outputs the security command and/or the activation command to the command notification section.

According to the heretofore described configuration, the determination section, in the event that the residual power of the information processing apparatus is of the given value or less, records the security command and/or the activation command, and in the event that the residual power exceeds the given value, outputs the security command and/or the activation command to the information processing apparatus. By this means, it is possible to cause the information processing apparatus to execute a security process, regardless of the residual power of the information processing apparatus.

In an embodiment of the invention, the communication control device further includes a power source section provided in such a way that it can supply power to the communication control device, and a power source switching section which supplies power to the communication control device by switching to either a power supply received from the information processing apparatus, or a power supply received from the power source section, and the determination section, in an event that the residual power acquired from the information processing apparatus is of the given value or less, issues an instruction to the power source switching section to switch to the power supply received from the power source section.

According to the heretofore described configuration, the determination section, in the event that the residual power acquired from the information processing apparatus is of the given value or less, issues an instruction to the power source switching section to switch to the power supply received from the power source section. By this means, it is possible to cause the information processing apparatus to execute a security process, regardless of the residual power of the information processing apparatus.

Hereafter, a detailed description will be given, while referring to the drawings, of more specific embodiments of the invention.

FIG. 1 illustrates an outline configuration of a data security system 1 according to an embodiment.

That is, the data security system 1 according to an embodiment includes an information processing apparatus 2, a server apparatus 3, and a communication control device 4.

The information processing apparatus 2 is, for example, a general purpose personal computer or other device.

The server apparatus 3 is, for example, an apparatus held by a communication carrier.

The communication control device 4, being a device having a function for connecting the information processing apparatus 2 to a network N, is, for example, of a card type, so that it is attachable to and detachable from the information processing apparatus 2.

In an embodiment, the communication control device 4 is mounted in a slot of the information processing apparatus 2.

Herein, although the network N in an embodiment is a portable communication network, not being limited to this, it is also acceptable that it is the Internet, Ethernet (registered trademark), a wireless LAN, WiMAX, or the like.

Although, in FIG. 1, one each of the information processing apparatus 2, server apparatus 3, and communication control device 4 are illustrated in order to simplify the description, the numbers of the information processing apparatus 2, server apparatus 3, and communication control device 4 configuring the data security system 1 are optional.

Also, it is also acceptable that a web server, a proxy server, a domain name system (DNS) server, a dynamic host configuration protocol (DHCP) server, a wireless base station apparatus (Node-B), a wireless network control apparatus (radio network controller: RNC), and the like, exist in the data security system 1.

The information processing apparatus 2 includes a CPU 21, a storage section 22, a security section 23, and an interface section (the IF section in the diagram) 24.

The CPU 21 controls an operation of each section 22 to 24 of the information processing apparatus 2.

Also, the CPU 21 has a function of interpreting and executing a notification command notified of by the communication control device 4.

The storage section 22 includes a hard disk drive (HDD) 22a, and an RAM 22b.

Various kinds of data, such as personal data, business data, and important data, is stored in the HDD 22a by an owner of the information processing apparatus 2.

Also, various kinds of data are also saved in the RAM 22b, as a backup area, by the CPU 21.

It is also acceptable that, apart from the HDD 22a and RAM 22b, a solid state drive (SSD), an ROM, a DRAM, an NVRAM, a recording medium (for example, an FD, a CD, or a DVD) attachable to and detachable from the information processing apparatus 2, or the like, is included in the storage section 22.

Herein, the CPU 21 of the information processing apparatus 2 according to an embodiment has a function of, by using an HDD cipher key, encoding the data stored in the HDD 22a.

Although, as encoding methods, there is a method of encoding using software, and a method of encoding using hardware, no particular limitation is intended.

In the case of encoding the data stored in the HDD 22a using the software, the CPU 21 records the HDD cipher key in a given area of the HDD 22a.

Also, in the case of encoding the data stored in the HDD 22a using the hardware, the HDD cipher key is recorded in advance in a given hardware area of the HDD 22a.

The security section 23 carries out a security process on the data stored in the storage section 22.

In an embodiment, the security section 23 operates in a basic input/output system (BIOS) mode, but it is also acceptable to configure in such a way that it operates in an extensible firmware interface (EFI) mode, or in a firmware mode equivalent to these.

Herein, as security processes, there is, for example, a process deleting the data stored in the storage section 22, and a process locking the information processing apparatus 2.

As the locking of the information processing apparatus 2, there is, for example, a stopping of a shift from the BIOS mode to an operating system (OS) mode, a stopping of the CPU 21 of the information processing apparatus 2, a stopping of a user interface function of the information processing apparatus 2, or a shutting down of the information processing apparatus 2.

Not being limited to the deleting of the data or the locking as the security process, it is possible to use a variety of optional security processes.

Also, it is also acceptable that, in the event that the security section 23 has carried out a security process, the CPU 21 displays the fact that the security process has been carried out on a display screen of the information processing apparatus 2.

The interface section 24 receives data from the communication control device 4, and transmits data to the communication control device 4.

The server apparatus 3 has a function of transmitting a remote control packet to the communication control device 4, via the network N, using, for example, a short message service (SMS).

Herein, a security process request command is included in the remote control packet.

That is, the owner of the information processing apparatus 2 communicates the fact that the information processing apparatus 2 has been stolen or lost to an operator of the communication carrier, by means of a telephone or the like.

Then, in the event that the identity of the owner of the information processing apparatus 2 who has made the communication is confirmed by the operator, the operator instructs the server apparatus 3 in such a way that a remote control packet is transmitted to the communication control device 4 mounted in the information processing apparatus 2.

By this means, the server apparatus 3 can transmit a remote control packet to the communication control device 4.

Alternatively, the owner of the information processing apparatus 2, by using an information processing apparatus differing from the information processing apparatus 2, accesses a web site dedicated to security process requests.

Then, after verifying that it is a legitimate owner, the web server which has recorded the web site dedicated to security process requests instructs the server apparatus 3 in such a way that a remote control packet is transmitted to the communication control device 4 mounted in the information processing apparatus 2.

By this means too, the server apparatus 3 can transmit a remote control packet to the communication control device 4.

The communication control device 4 includes an interface section (the IF section in the diagram) 41, a register 42, a reception section 43, an identification section 44, an operational condition recording section 45, an operational condition acquisition section 46, a command recording section 47, a command control section 48, and a deletion range recording section 49.

The interface section 41 is one embodiment of a command notification section according to some embodiments of the invention.

Herein, all or one portion of each function of the interface section 41, reception section 43, identification section 44, operational condition acquisition section 46, and command control section 48 may be realized by a computing device, such as a CPU, included in the communication control device (computer) executing a given program.

Consequently, the program for realizing each of the heretofore described functions with the communication control device, or a recording medium on which the program is recorded, is also an embodiment of the invention.

Also, the register 42, operational condition recording section 45, command recording section 47, and deletion range recording section 49 are realized by a built-in storage device of the communication control device, or by a storage device accessible from the computer.

The interface section 41 receives data from the information processing apparatus 2, and transmits data to the information processing apparatus 2.

The register 42 correlates and records a security process the security section 23 of the information processing apparatus 2 is to carry out, and a flag.

That is, the security section 23, by referring to the register 42 via the interfaces 24 and 41, executes a security process with which a flag is standing.

Figure 2:
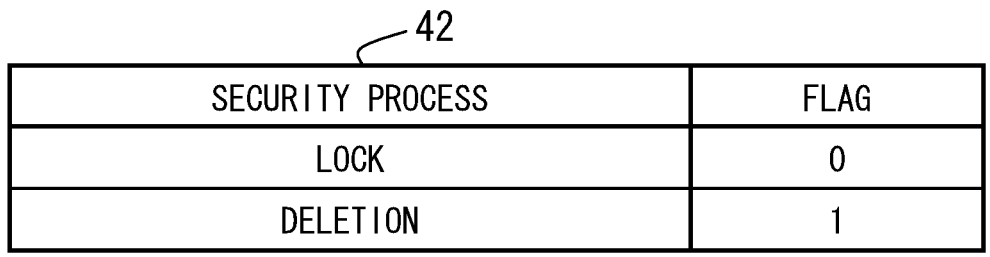
FIG. 2 illustrates an example of data recorded in a register of a communication control device.

FIG. 2 illustrates an example of data recorded in the register 42 according to an embodiment.

As illustrated in FIG. 2, a security process "Lock", and a flag "0" correlated to the "Lock", are recorded in the register 42.

Also, a security process "Deletion", and a flag "1" correlated to the "Deletion", are recorded in the register 42.

That is, in an embodiment, as the flag "1" is standing with the security process "Deletion", the security section 23 carries out a security process deleting the data stored in the storage section 22.

It is acceptable that the contents of the register 42 are unchangeably recorded in advance, and it is also acceptable that they are recorded in such a way as to be optionally updatable by the owner of the information processing apparatus 2.

The reception section 43 receives a remote control packet transmitted from the server apparatus 3, via the network N.

The reception section 43 outputs the remote control packet received to the identification section 44.

The identification section 44 determines whether or not a security process request command is included in the remote control packet received by the reception section 43.

The identification section 44, in the event of determining that a security process request command is included in the remote control packet, extracts the request command from the remote control packet, and outputs the extracted request command to the operational condition acquisition section 46.

The operational condition recording section 45 records the current operational condition of the information processing apparatus 2.

That is, in the event that the operational condition of the information processing apparatus 2 has shifted, the CPU 21 of the information processing apparatus 2 records the operational condition after the shift in the operational condition recording section 45, via the interface sections 24 and 41.

By this means, the operational condition of the information processing apparatus 2 is recorded in the operational condition recording section 45 in its latest condition.

Figure 3:
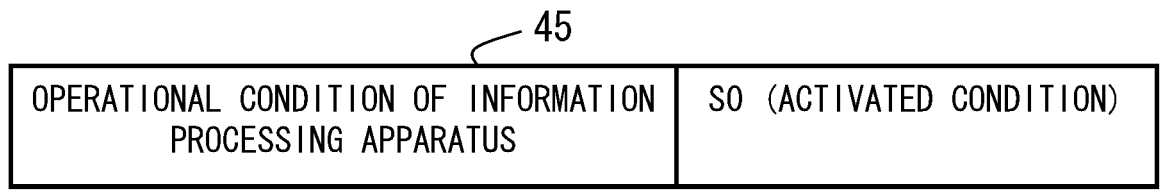
FIG. 3 illustrates an example of data recorded in an operational condition recording section of a communication control device.

FIG. 3 illustrates an example of data recorded in an operational condition recording section 45 according to an embodiment.

As illustrated in FIG. 3, "S0" is recorded in the operational condition recording section 45 as the operational condition of the information processing apparatus 2.

That is, in an embodiment, one operational condition from among "S0" to "S5", prescribed by an advanced configuration and power interface (ACPI), is recorded in the operational condition recording section 45.

Herein, "S0" to "S2" (FIG. 4) indicate that the information processing apparatus 2 is in the activated condition.

"S3" indicates that the information processing apparatus 2 is in a standby mode.

The standby mode is a condition in which a power supply including to a graphics function, the HDD 22a, and/or other devices of the information processing apparatus 2 is stopped.

However, a refreshing operation is being carried out on the RAM 22b.

"S4" indicates that the information processing apparatus 2 is in a hibernate mode.

The hibernate mode is almost the same condition as the standby mode, but the power supply to the RAM 22b is stopped.

"S5" indicates that the information processing apparatus 2 is in a shutdown mode.

The shutdown mode is a condition in which a power source of the information processing apparatus 2 is completely deactivated.

It is acceptable that the contents of the operational condition recording section 45 are unchangeably recorded in advance, and it is also acceptable that they are recorded in such a way as to be optionally updatable by the owner of the information processing apparatus 2.

The operational condition acquisition section 46, in the event that a request command is output from the identification section 44, acquires the current operational condition of the information processing apparatus 2 by retrieving the operational condition of the information processing apparatus 2 recorded in the operational condition recording section 45.

It is also acceptable to configure in such a way that the operational condition acquisition section 46, instead of retrieving the operational condition of the information processing apparatus 2 recorded in the operational condition recording section 45, acquires the operational condition of the information processing apparatus 2 directly from the information processing apparatus 2, via the interface sections 41 and 24.

The operational condition acquisition section 46 outputs the acquired operational condition of the information processing apparatus 2 to the command control section 48.

The command recording section 47 correlates and records the operational condition of the information processing apparatus 2, and a notification command of which the information processing apparatus 2 is to be notified.

FIG. 4 illustrates an example of data recorded in the command recording section 47 according to the embodiment.

That is, in an event that the operational condition of the information processing apparatus 2 is the activated condition (S0 to S2), "Interrupt" is recorded in the command recording section 47 according to an embodiment as a command of which the information processing apparatus 2 is to be notified.

Herein, "Interrupt" is an interruption command for interrupting a process currently being executed by the information processing apparatus 2, and causing the information processing apparatus 2 to reactivate in order to shift it to a BIOS mode.

A security command for causing the information processing apparatus 2 to execute a security process on the data is included in "Interrupt".

Also, in an event that the operational condition of the information processing apparatus is a standby mode (S3), a hibernate mode (S4), or a shutdown mode (S5), "PME" (power management event) is recorded in the command recording section 47 according to an embodiment as the notification command of which the information processing apparatus 2 is to be notified.

Herein, "PME" is an activation command (wake command) for activating the information processing apparatus 2.

However, in an embodiment, "PME" is a command which shifts the information processing apparatus 2 to the BIOS mode only, without shifting it to the OS mode.

A security command for causing the information processing apparatus 2 to execute a security process on the data is included in "PME" too.

The command control section 48, based on the operational condition of the information processing apparatus 2 acquired by the operational condition acquisition section 46, retrieves the notification command of which the information processing apparatus 2 is to be notified from the command recording section 47.

For example, in the event that the operational condition of the information processing apparatus 2 acquired by the operational condition acquisition section 46 is "S0", the command control section 48, based on the operational condition "S0" of the information processing apparatus 2, retrieves "Interrupt" from the command recording section 47 (refer to FIG. 4).

The command control section 48 outputs the retrieved notification command to the interface section 41.

The interface section 41 notifies the information processing apparatus 2 of the notification command output from the command control section 48.

Herein, in an embodiment, in the event that there is no response from the information processing apparatus 2 despite the interface section 41 having notified the information processing apparatus 2 of the notification command, the command control section 48 generates a "Reset" command.

The interface section 41 notifies the information processing apparatus 2 of the "Reset" command generated by the command control section 48.

By this means, the communication control device 4 can reset the information processing apparatus 2.

The deletion range recording section 49 correlates and records the operational condition of the information processing apparatus 2, and a deletion range of the data stored in the storage section 22 of the information processing apparatus 2.

That is, in an event that the flag "1" is standing with the security process "Deletion" of the register 42, the security section 23 of the information processing apparatus 2, by referring to the deletion range recording section 49 via the interface sections 24 and 41, deletes the data of the storage section 22 within the deletion range correlated to the operational condition of the information processing apparatus 2 recorded in the operational condition recording section 45.

FIG. 5 illustrates an example of data recorded in a deletion range recording section 49 according to an embodiment.

That is, in the event that the operational condition of the information processing apparatus 2 is the activated condition (S0 to S2), "HDD (whole)", "RAM" is recorded in the deletion range recording section 49 according to the embodiment as the deletion range of the data.

That is, in an event that the information processing apparatus 2 is in the activated condition, the security section 23 deletes all the data stored including in the HDD 22a, and the data stored in the RAM 22b.

Also, in the event that the operational condition of the information processing apparatus 2 is the standby mode (S3), "HDD (cipher key)", "RAM" is recorded in the deletion range recording section 49 according to an embodiment as the deletion range of the data.

That is, in the event that the information processing apparatus 2 is in the standby mode, the security section 23 deletes the HDD cipher key stored in the HDD 22a, and the data stored in the RAM 22b.

That is, as the refreshing operation is being carried out on the RAM 22b in the event that the operational condition of the information processing apparatus 2 is "S0" to "S3", the data are stored in the RAM 22b.

For this reason, "RAM" is included as the deletion range.

Also, in the event that the operational condition of the information processing apparatus 2 is the hibernate mode (S4), or the shutdown mode (S5), "HDD (cipher key)" is recorded in the deletion range recording section 49 according to the embodiment as the deletion range of the data.

That is, in the event that the information processing apparatus 2 is in the hibernate mode, or the shutdown mode, the security section 23 deletes the HDD cipher key stored in the HDD 22a.

That is, as the refreshing operation is not being carried out on the RAM 22b in the event that the operational condition of the information processing apparatus 2 is "S4" or "S5", the data are not stored in the RAM 22b.

For this reason, "RAM" is not included as the deletion range.

It is acceptable that the contents of the deletion range recording section 49 are unchangeably recorded in advance, and it is also acceptable that they are recorded in such a way as to be optionally updatable by the owner of the information processing apparatus 2.

Also, it is also acceptable to configure in such a way that the CPU 21 of the information processing apparatus 2, in the BIOS mode, extracts a list of storage devices of the information processing apparatus 2, and presents the extracted list to the owner of the information processing apparatus 2.

By this means, the owner of the information processing apparatus 2 can easily select the storage device which is to fall within the deletion range.

Furthermore, it is also acceptable to configure in such a way as to include the deletion range recording section 49 in the information processing apparatus 2, instead of the communication control device 4.

Figure 6:
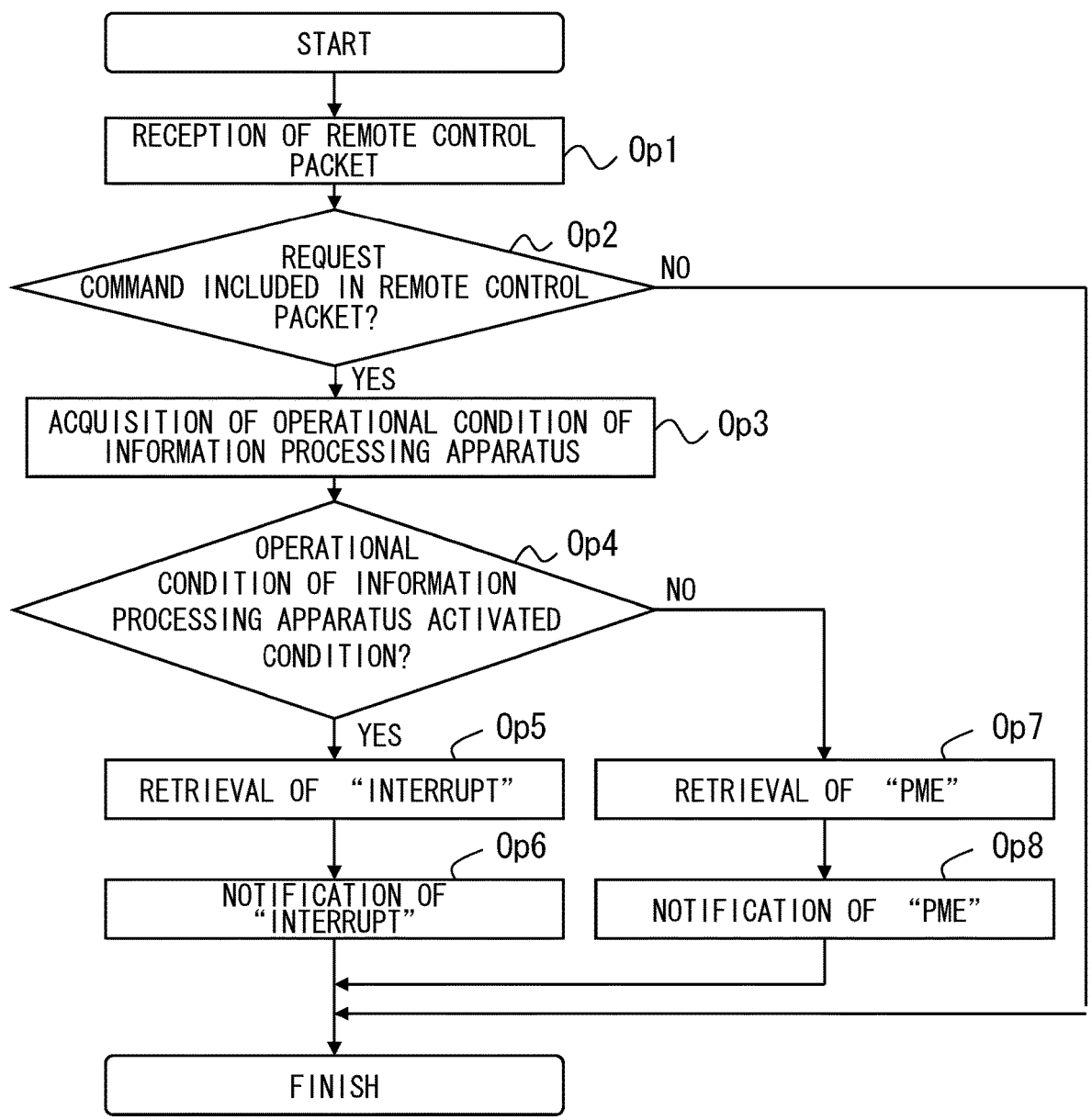
FIG. 6 illustrates an example of an operation of a communication control device in an event of receiving a remote control packet transmitted from a server apparatus.
Figure 7:
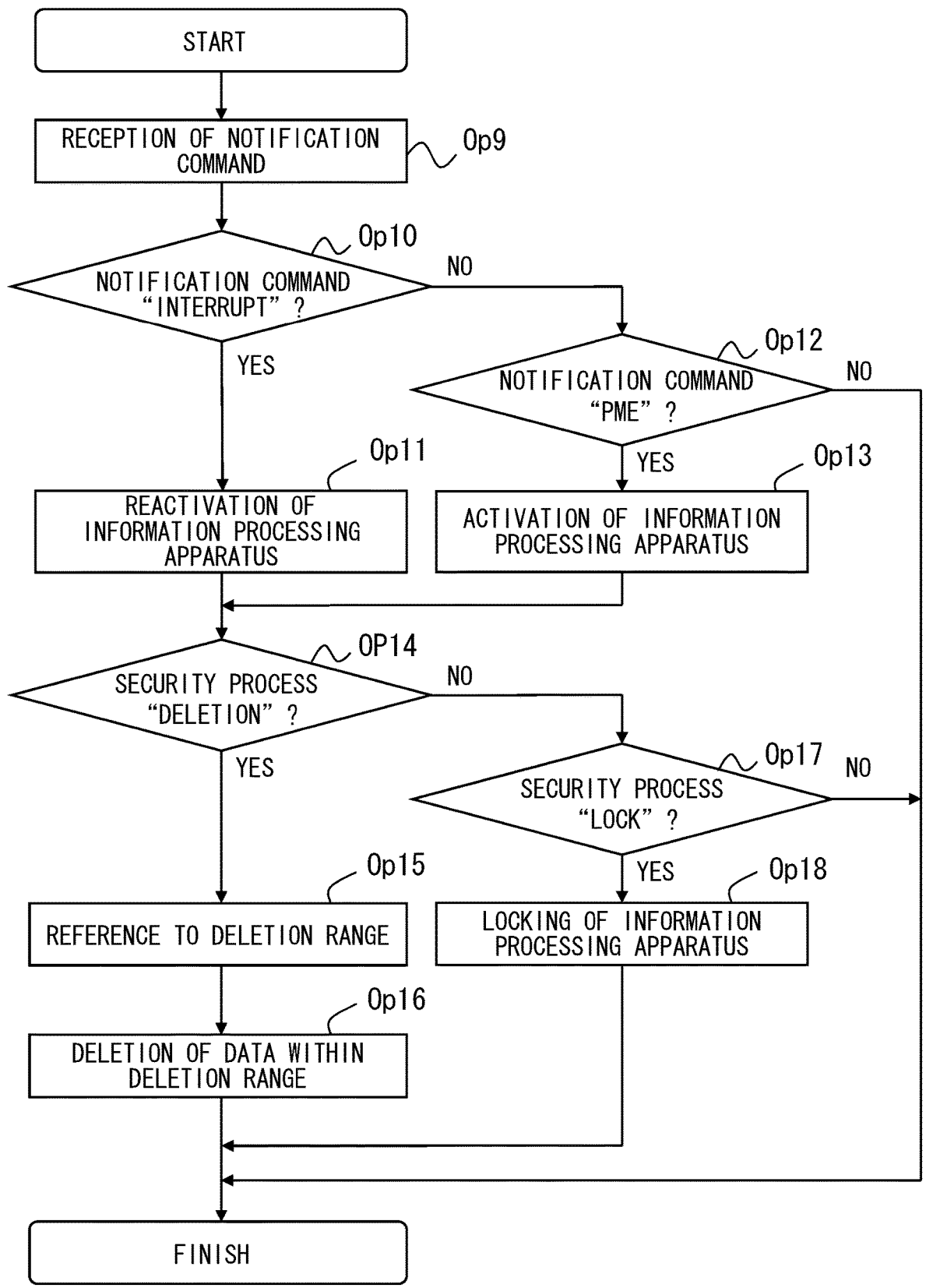
FIG. 7 illustrates an example of an operation of an information processing apparatus in an event of receiving a notification command notified of by a communication control device.

Next, a description is given, while referring to FIGS. 6 and 7, of an operation of the data security system 1 according to the heretofore described configuration.

FIG. 6 is a flowchart illustrating an example of an operation of the communication control device 4 in an event of receiving a remote control packet transmitted from the server apparatus 3.

As illustrated in FIG. 6, the reception section 43 receives a remote control packet transmitted from the server apparatus 3, via the network N (Operation Op1).

The identification section 44 determines whether or not a (security process) request command is included in the remote control packet received in Operation Op1 (Operation Op2).

If it determines that a request command is included in the remote control packet (Operation Op2: Yes), the identification section 44 extracts the request command from the remote control packet, and outputs the extracted request command to the operational condition acquisition section 46.

Then, the process proceeds to Operation Op3.

Meanwhile, if it determines that no request command is included in the remote control packet (Operation Op2: No), the identification section 44 finishes the process of FIG. 6.

If a request command is output from the identification section 44, the operational condition acquisition section 46, by retrieving an operational condition of the information processing apparatus 2 recorded in the operational condition recording section 45, acquires a current operational condition of the information processing apparatus 2 (Operation Op3).

Herein, if the operational condition acquired in Operation Op3 is the activated condition (Operation Op4: Yes), the command control section 48 retrieves "Interrupt" from the command recording section 47 (Operation Op5).

Then, the interface section 41 notifies the information processing apparatus 2 of the "Interrupt" retrieved in Operation Op5 (Operation Op6).

Meanwhile, if the operational condition acquired in Operation Op3 is a standby mode, a hibernate mode, or a shutdown mode (Operation Op4: No), the command control section 48 retrieves "PME" from the command recording section 47 (Operation Op7).

Then, the interface section 41 notifies the information processing apparatus 2 of the "PME" retrieved in Operation Op7 (Operation Op8).

FIG. 7 illustrates an example of an operation of the information processing apparatus 2 in the event of receiving a notification command notified of by the communication control device 4.

As illustrated in FIG. 7, the interface section 24 of the information processing apparatus 2 receives a notification command notified of by the communication control device 4 (Operation Op9).

Then, the CPU 21 determines whether or not the notification command received in Operation Op9 is "Interrupt" (Operation Op10).

If it determines that the notification command is "Interrupt" (Operation Op10: Yes), the CPU 21, in order to shift the information processing apparatus 2 to the BIOS mode, interrupts the process currently being executed, and reactivates the information processing apparatus 2 (Operation Op11).

Meanwhile, if it determines that the notification command is not "Interrupt" (Operation Op10: No), the CPU 21 determines whether or not the notification command is "PME" (Operation Op12).

If it determines that the notification command is "PME" (Operation Op12: Yes), the CPU 21, in order to put the information processing apparatus 2, which has been in the standby mode, hibernate mode, or shutdown mode, into the activated condition, activates (starts up) the information processing apparatus 2 (Operation Op13).

In this case, the CPU 21 shifts the information processing apparatus 2 to the BIOS mode only, without shifting it to the OS mode.

Also, a function which, even in the event that the operational condition of the information processing apparatus 2 is the shutdown mode, receives the notification command "PME", and executes the received "PME", is included in advance in the information processing apparatus 2.

Meanwhile, if it determines that the notification command is not "PME" (Operation Op12: No), the CPU 21 finishes the process of FIG. 7.

In the BIOS mode, the security section 23, by referring to the register 42 via the interface sections 24 and 41, determines whether or not the flag "1" is standing with the security process "Deletion" (Operation Op14).

If it determines that the flag "1" is standing with the security process "Deletion" (Operation Op14: Yes), the security section 23, based on the operational condition of the information processing apparatus 2 recorded in the operational condition recording section 45, refers to the deletion range recorded in the deletion range recording section 49 (Operation Op15).

Then, the security section 23 deletes the data of the storage section 22 within the deletion range referred to in Operation Op15 (Operation Op16).

Meanwhile, if it determines that the flag "1" is not standing with the security process "Deletion" (Operation Op14: No), the security section 23 determines whether or not the flag "1" is standing with the security process "Lock" (Operation Op17).

If it determines that the flag "1" is standing with the security process "Lock" (Operation Op17: Yes), the security section 23 locks the information processing apparatus 2 (Operation Op18).

Meanwhile, if it determines that the flag "1" is not standing with the security process "Lock" (Operation Op17: No), the security section 23 finishes the process of FIG. 7.

In the way heretofore described, according to the data security system 1 according to an embodiment, the operational condition acquisition section 46 acquires the operational condition of the information processing apparatus 2.

Then, in the event that the operational condition is the activated condition, the interface section 41 notifies the information processing apparatus 2 of a security command for causing the information processing apparatus 2 to execute a security process on the data.

Also, in the event that the operational condition is the standby mode, hibernate mode, or shutdown mode, the interface section 41 notifies the information processing apparatus 2 of an activation command for activating the information processing apparatus 2, and of a security command for causing the information processing apparatus 2 to execute a security process on the data.

By this means, it is possible to cause the information processing apparatus 2 to execute a security process, regardless of the operational condition of the information processing apparatus 2.

In the heretofore described embodiment, a description is given of an example in which the communication control device 4 is mounted in a mounting slot of the information processing apparatus 2.

Alternative to this, in another example, a description is given of a case in which the communication control device 4 is a device which can wirelessly access the information processing apparatus 2.

Figure 8:
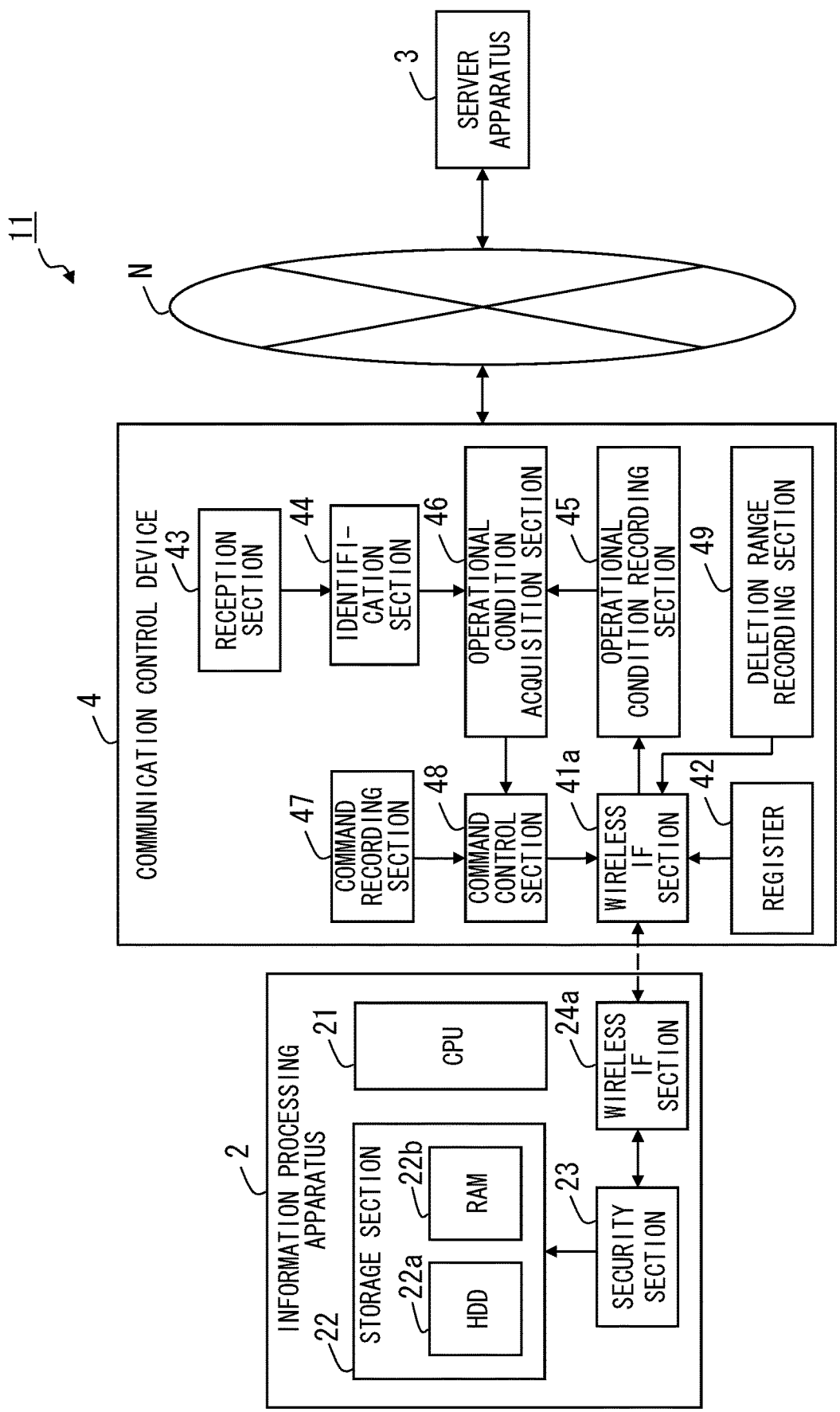
FIG. 8 illustrates an outline configuration of a data security system according to an example of the invention.

That is, a data security system 11 according to an example, as illustrated in FIG. 8, includes a wireless interface section 24a in the information processing apparatus 2, and a wireless interface section 41a in the communication control device 4.

By this means, the information processing apparatus 2 and communication control device 4 can access each other wirelessly.

As a result of this, there is no need to mount the communication control device 4 in the mounting slot of the information processing apparatus 2, and the information processing apparatus 2 and communication control device 4 can carry out an exchange of data with each other, even in a case in which the information processing apparatus 2 and communication control device 4 are separated by a certain constant distance.

Figure 9:
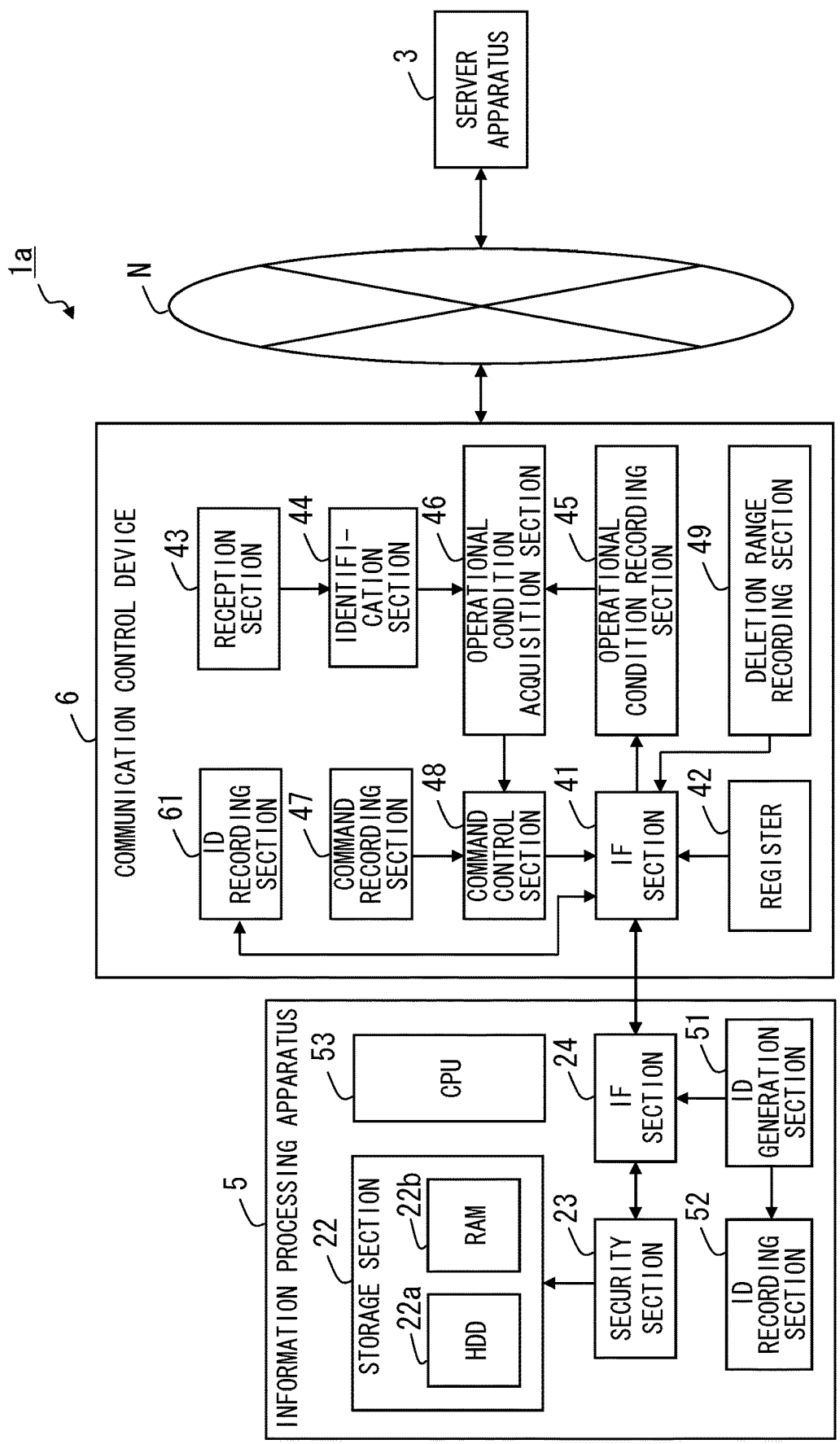
FIG. 9 illustrates an outline configuration of a data security system according to an embodiment of the invention.

FIG. 9 illustrates an outline configuration of a data security system 1a according to an embodiment.

That is, in the data security system 1a according to an embodiment, functions of an information processing apparatus 5 and communication control device 6 differ from those of the information processing apparatus 2 and communication control device 4 illustrated in FIG. 1.

Specifically, the information processing apparatus 5 illustrated in FIG. 9, in addition to the function(s) of the information processing apparatus 2 illustrated in FIG. 1, includes an ID generation section 51, and an ID recording section 52.

Also, the information processing apparatus 5 illustrated in FIG. 9 includes a CPU 53 instead of the CPU 21 illustrated in FIG. 1.

The communication control device 6 illustrated in FIG. 9, in addition to the functions of the communication control device 4 illustrated in FIG. 1, includes an ID recording section 61.

In FIG. 9, the same reference numerals and characters are appended to components having the same functions as those in FIG. 1, and a detailed description thereof is omitted.

The ID generation section 51 of the information processing apparatus 5 generates ID (identification: an identification number). While the ID information described refers to a number, the present invention is not limited thereto any may include any identifier uniquely indicating a component.

For example, the ID generation section 51 generates ID using a serial number of the information processing apparatus 5 but, not being limited to this, it is also acceptable to generate ID using a random number, and it is also acceptable to generate ID using an IP address or MAC address of the information processing apparatus 5.

That is, provided that it can generate ID whose uniqueness is guaranteed, a method by which the ID generation section 51 generates ID is optional.

The ID generation section 51 records the generated ID in the ID recording section (a first ID recording section) 52 of the information processing apparatus 5.

By this means, the ID (first ID) generated by the ID generation section 51 is recorded in the ID recording section 52.

Also, the ID generation section 51 records the generated ID in the ID recording section (a second ID recording section) 61 of the communication control device 6, via the interface sections 24 and 41.

By this means, the ID (second ID) generated by the ID generation section 51 is recorded in the ID recording section 61.

In the event that the interface section 24 of the information processing apparatus 5 receives a notification command notified of by the communication control device 6, the CPU (legitimacy confirmation section) 53, firstly, retrieves the ID recorded in the ID recording section 61 of the communication control device 6, via the interface sections 24 and 41.

Also, the CPU 53 retrieves the ID recorded in the ID recording section 52 of the information processing apparatus 5.

The CPU 53, by comparing the ID retrieved from the ID recording section 61 and the ID retrieved from the ID recording section 52, determines whether or not the ID match each other.

That is, the information processing apparatus 5 can determine whether or not the communication control device 6 is a legitimate communication control device.

Herein, in the event that it determines that the ID match each other, the CPU 53 interprets and executes the notification command notified of by the communication control device 6.

That is, in the event that the ID match each other, it is guaranteed that the information processing apparatus 5 and communication control device 6 correspond one-to-one.

Meanwhile, in the event that it determines that the ID do not match each other, the CPU 53 discards the notification command notified of by the communication control device 6.

That is, in the event that the ID do not match each other, it is not guaranteed that the information processing apparatus 5 and communication control device 6 correspond one-to-one.

In this case, the CPU 53 notifies the communication control device 6, via the interface section 24, of an error signal indicating that the notification command has been discarded.

Next, a description will be given, while referring to FIG. 10, of an operation of the data security system 1a according to the heretofore described configuration.

Figure 10:
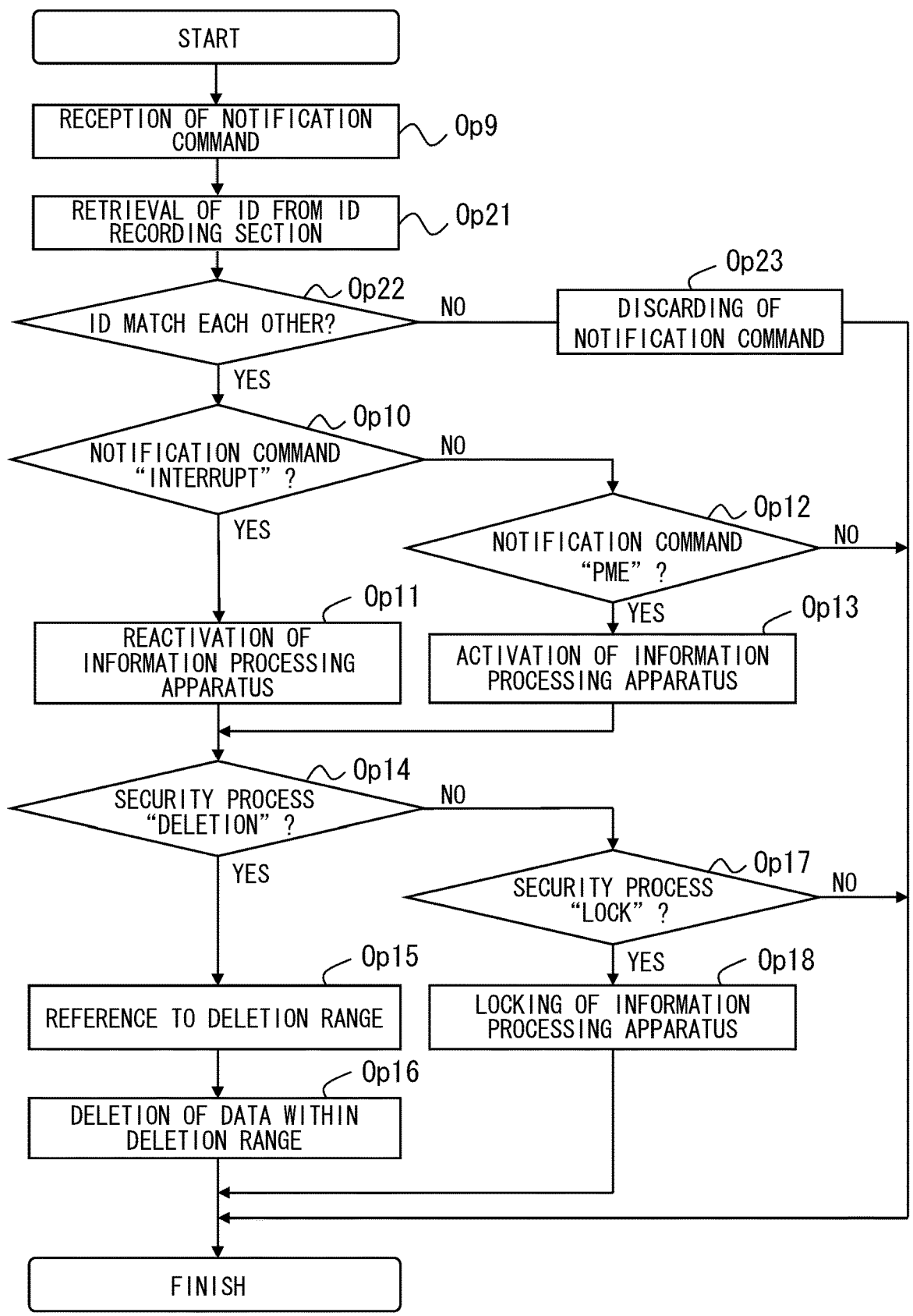
FIG. 10 illustrates an example of an operation of an information processing apparatus in an event of receiving a notification command notified of by a communication control device.

FIG. 10 illustrates an example of an operation of the information processing apparatus 5 in the event of receiving a notification command notified of by the communication control device 6.

In FIG. 10, the same reference numerals and characters are appended to portions indicating the same processes as those in FIG. 7, and a detailed description thereof is omitted.

After Operation Op9, the CPU 53 retrieves the ID recorded in the ID recording section 61 of the communication control device 6, via the interface sections 24 and 41 (Operation Op21).

Also, the CPU 53 retrieves the ID recorded in the ID recording section 52 of the information processing apparatus 5 (Operation Op21).

Then, the CPU 53, by comparing the ID retrieved from the ID recording section 61 and the ID retrieved from the ID recording section 52, determines whether or not the ID match each other (Operation Op22).

If it determines that the ID match each other (Operation Op22: Yes), the CPU 53 proceeds to Operation Op10, and executes the determination process of Operation Op10.

Meanwhile, if it determines that the ID do not match each other (Operation Op22: No), the CPU 53 discards the notification command received in Operation Op9 (Operation Op23), and finishes the process of FIG. 10.

In the way heretofore described, according to the data security system 1a according to an embodiment, in the event that the communication control device 6 is not a legitimate communication control device, the information processing apparatus 5 can discard the notification command notified of by the interface section 41 included in the communication control device 6.

In the heretofore described embodiment, a description is given of an example in which the CPU 53 of the information processing apparatus 5, by comparing the ID recorded in the ID recording section 61 of the communication control device 6, and the ID recorded in the ID recording section 52 of the information processing apparatus 5, determines whether or not the ID match each other, but this is not limiting.

For example, it is also acceptable to configure in such a way as to include in the communication control device 6 a legitimacy confirmation section which determines, by comparing the ID recorded in the ID recording section 61 of the communication control device 6, and the ID recorded in the ID recording section 52 of the information processing apparatus 5, whether or not the ID match each other.

That is, the communication control device 6 can determine whether or not the information processing apparatus 5 is a legitimate information processing apparatus.

Figure 11:
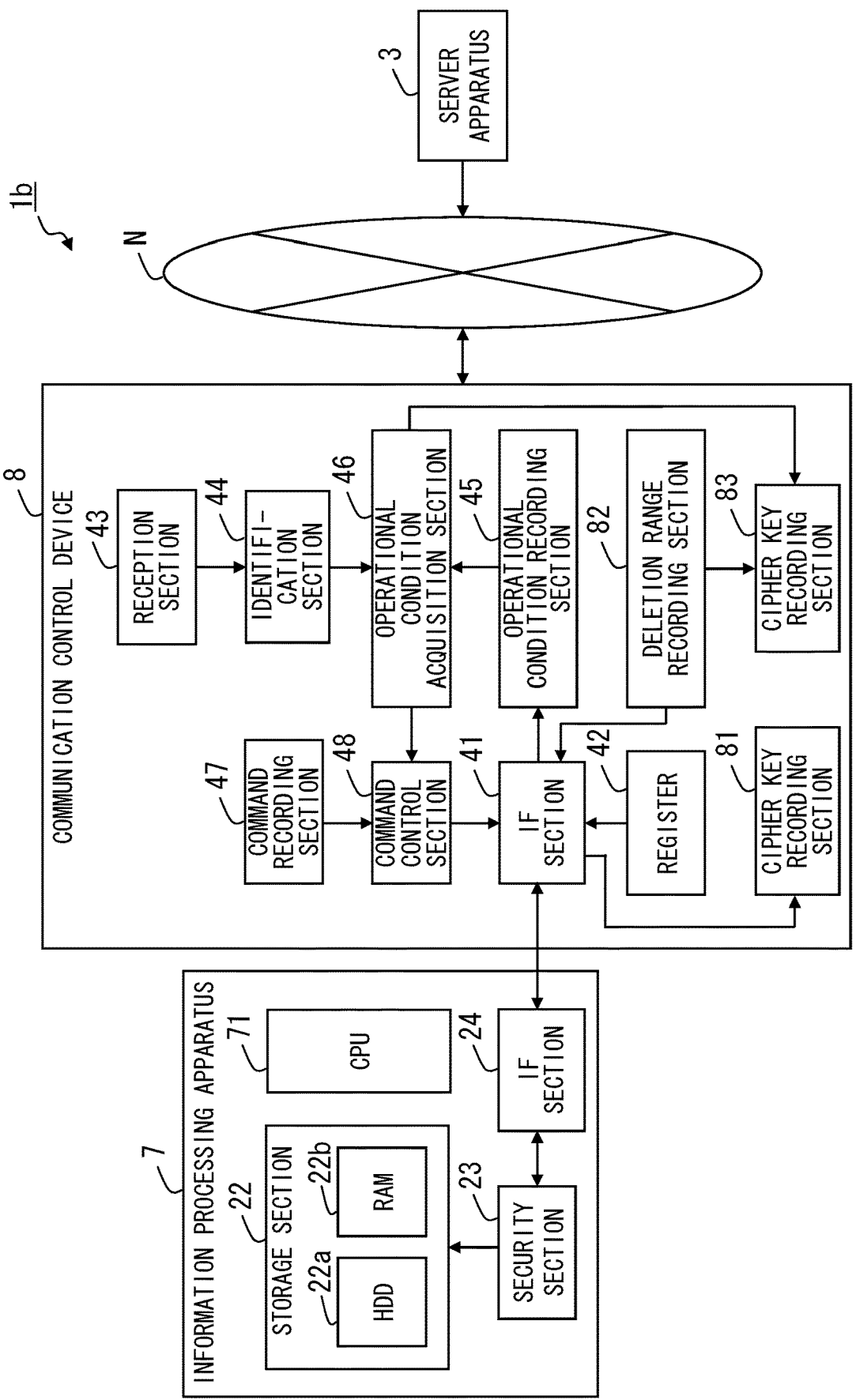
FIG. 11 illustrates an outline configuration of a data security system according to an embodiment of the invention.

FIG. 11 is a block diagram illustrating an outline configuration of a data security system 1b according to an embodiment.

That is, in the data security system 1b according to an embodiment, function(s) of an information processing apparatus 7 and communication control device 8 differ from those of the information processing apparatus 2 and communication control device 4 illustrated in FIG. 1.

Specifically, the information processing apparatus 7 illustrated in FIG. 11 includes a CPU 71 instead of the CPU 21 illustrated in FIG. 1.

The communication control device 8 illustrated in FIG. 11, in addition to the function(s) of the communication control device 4 illustrated in FIG. 1, includes a cipher key recording section 81, and a cipher key deletion section 83.

Also, the communication control device 8 illustrated in FIG. 11 includes a deletion range recording section 82 instead of the deletion range recording section 49 illustrated in FIG. 1.

In FIG. 11, the same reference numerals and characters are appended to components having the same functions as those in FIG. 1, and a detailed description thereof is omitted.

The CPU (encoding execution section) 71 of the information processing apparatus 7, in the same way as the CPU 21 illustrated in FIG. 1, has a function of encoding the data stored in the HDD 22a by using the HDD cipher key.

However, the CPU 71 according to an embodiment records the HDD cipher key in the cipher key recording section 81 of the communication control device 8, via the interface sections 24 and 41.

Specifically, the CPU 71 according to an embodiment, in the event that the power source of the information processing apparatus 7 is deactivated (the shutdown mode), retrieves the HDD cipher key which has been recorded in a given area of the HDD 22a, and records the retrieved HDD cipher key in the cipher key recording section 81.

Also, on the power source of the information processing apparatus 7 being activated (the activated condition), the CPU 71 retrieves the HDD cipher key from the cipher key recording section 81, and records the retrieved HDD cipher key again in the given area of the HDD 22a.

That is, in the event that the operational condition of the information processing apparatus 7 is the shutdown mode, the HDD cipher key is recorded in the cipher key recording section 81, while in the event that the operational condition of the information processing apparatus 7 is the activated condition, the HDD cipher key is recorded in the given area of the HDD 22a.

The deletion range recording section 82 of the communication control device 8, in the same way as the deletion range recording section 49 illustrated in FIG. 1, correlates and records the operational condition of the information processing apparatus 7, and the deletion range of the data stored in the storage section 22 of the information processing apparatus 7.

FIG. 12 is a diagram illustrating an example of data recorded in the deletion range recording section 82 according to an embodiment.

That is, in contrast to the deletion range recording section 49 illustrated in FIG. 5, in the event that the operational condition of the information processing apparatus 7 is the shutdown mode (S5), "Cipher key recording section" is recorded in the deletion range recording section 82 according to the embodiment as the deletion range of the data.

The cipher key deletion section 83, by referring to the deletion range recording section 82, deletes the HDD cipher key recorded in the cipher key recording section 81 in the event that the deletion range correlated to the operational condition of the information processing apparatus 7 acquired by the operational condition acquisition section 46 indicates "Cipher key recording section".

For example, in the event that the operational condition of the information processing apparatus 7 acquired by the operational condition acquisition section 46 is "S5", as the deletion range correlated to the operational condition "S5" of the information processing apparatus 7 in the deletion range recording section 82 indicates "Cipher key recording section" (refer to FIG. 12), the cipher key deletion section 83 deletes the HDD cipher key recorded in the cipher key recording section 81.

On the cipher key deletion section 83 deleting the HDD cipher key recorded in the cipher key recording section 81, the cipher key deletion section 83 notifies the command control section 48 of the fact that it has deleted the HDD cipher key recorded in the cipher key recording section 81.

In this case, the command control section 48 finishes the process without retrieving from the command recording section 47 a notification command of which the information processing apparatus 7 is to be notified.

For this reason, the interface section 41 does not notify the information processing apparatus 7 of a notification command.

By this means, it is possible to carry out a security process without activating or reactivating the information processing apparatus 7.

In the way heretofore described, according to the data security system 1b according to an embodiment, in the event that the data deletion range correlated to the operational condition of the information processing apparatus 7 acquired by the operational condition acquisition section 46 in the deletion range recording section 82 indicates the cipher key recorded in the cipher key recording section 81, the cipher key deletion section 83 deletes the cipher key recorded in the cipher key recording section 81 included in the communication control device 8.

By this means, it is possible to execute a security process without requiring the interface section 41 of the communication control device 8 to notify the information processing apparatus 7 of a notification command.

Figure 13:
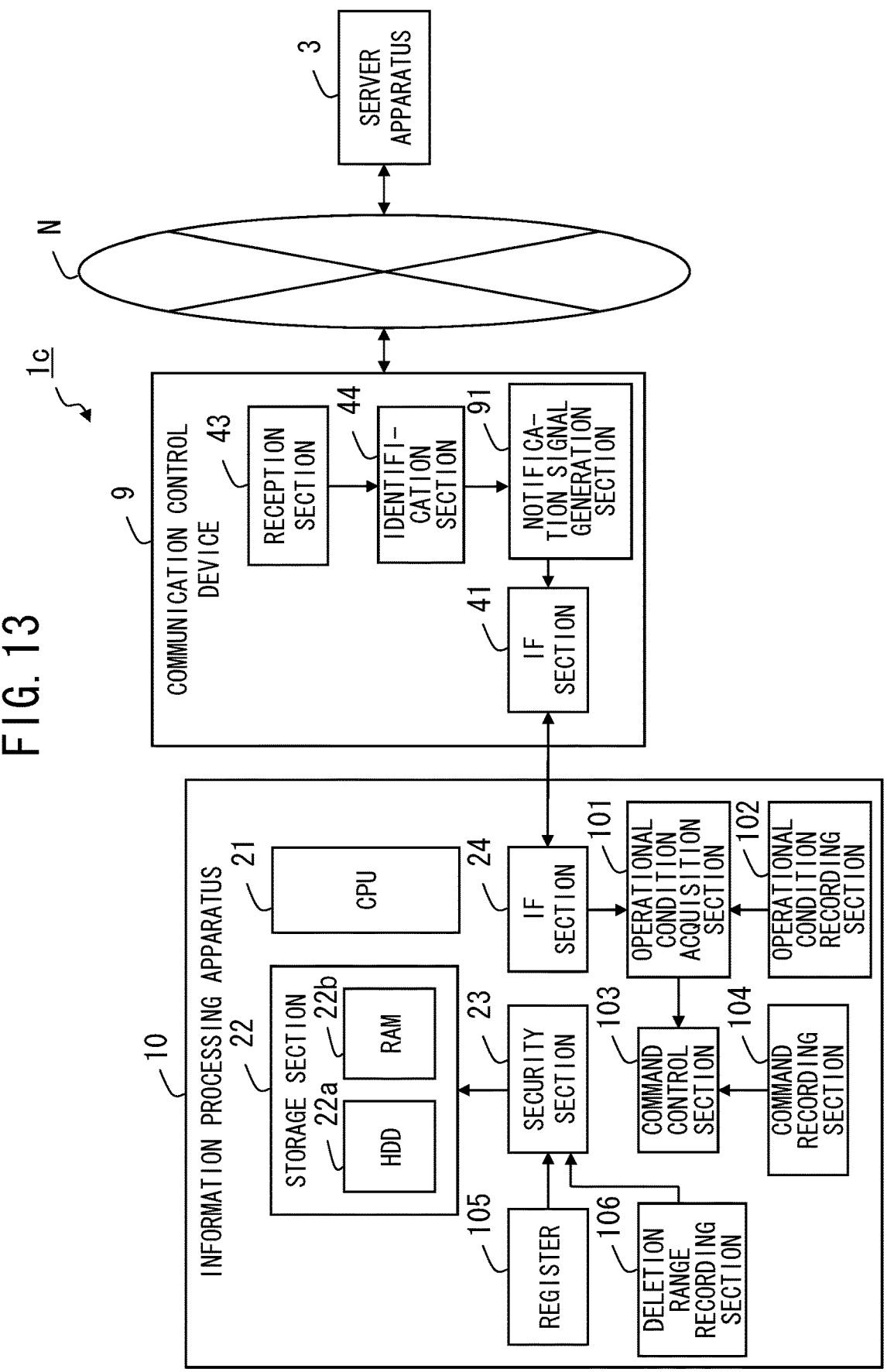
FIG. 13 illustrates an outline configuration of a data security system according to embodiment(s) of the invention.

FIG. 13 illustrates an outline configuration of a data security system 1c according to an embodiment.

That is, in the data security system 1c according to an embodiment, functions of a communication control device 9 and information processing apparatus 10 differ from those of the communication control device 4 and information processing apparatus 2 illustrated in FIG. 1.

Specifically, the communication control device 9 illustrated in FIG. 13, when compared with the communication control device 4 illustrated in FIG. 1, newly includes a notification signal generation section 91.

However, the register 42, operational condition recording section 45, operational condition acquisition section 46, command recording section 47, command control section 48, and deletion range recording section 49 illustrated in FIG. 1 are not included in the communication control device 9 illustrated in FIG. 13.

Also, the information processing apparatus 10 illustrated in FIG. 13 includes, in addition to the functions of the information processing apparatus 2 illustrated in FIG. 1, an operational condition acquisition section 101, an operational condition recording section 102, a command control section 103, a command recording section 104, a register 105, and a deletion range recording section 106.

That is, the register 42, operational condition recording section 45, operational condition acquisition section 46, command recording section 47, command control section 48, and deletion range recording section 49, included in the communication control device 4 illustrated in FIG. 1, are included in the information processing apparatus 10.

In FIG. 13, the same reference numerals and characters are appended to components having the same functions as those in FIG. 1, and a detailed description thereof is omitted.

The notification signal generation section 91 of the communication control device 9, in the event that a security process request command is output from the identification section 44, generates a notification signal "Wake" for causing the information processing apparatus 10 to execute a security process.

The notification signal generation section 91 outputs the generated notification signal "Wake" to the interface section 41.

The interface section 41 transmits the notification signal "Wake" output from the notification signal generation section 91 to the information processing apparatus 10.

The interface section 24 of the information processing apparatus 10 receives the notification signal "Wake" output from the interface section 41 of the communication control device 9.

The interface section 24 outputs the received notification signal "Wake" to the operational condition acquisition section 101.

The operational condition acquisition section 101, in the event that the notification signal "Wake" is output from the interface section 24, acquires the current operational condition of the information processing apparatus 10 by retrieving the operational condition of the information processing apparatus 10 recorded in the operational condition recording section 102.

The operational condition acquisition section 101 outputs the acquired operational condition of the information processing apparatus 10 to the command control section 103.

The command control section 103, based on the operational condition of the information processing apparatus 10 acquired by the operational condition acquisition section 101, retrieves from the command recording section 104 a notification command of which the CPU 21 is to be notified.

The command control section 103 notifies the CPU 21 of the retrieved notification command.

In the event that the notification command notified of by the command control section 103 is "Interrupt", the CPU 21, in order to shift the information processing apparatus 10 to the BIOS mode, interrupts the process currently being executed, and reactivates the information processing apparatus 10.

Meanwhile, in the event that the notification command notified of by the command control section 103 is "PME", the CPU 21, in order to put the information processing apparatus 10, which has been in the standby mode, hibernate mode, or shutdown mode, into the activated condition, activates (starts up) the information processing apparatus 10.

In the BIOS mode, the security section 23, by referring to the register 105 and deletion range recording section 106, carries out a security process on the data stored in the storage section 22.

In the way heretofore described, according to the data security system 1c according to an embodiment, the information processing apparatus 10 can carry out a security process on the data stored in the storage section 22, based only on the notification signal from the communication control device 9.

In the heretofore described Embodiment 4, a configuration is such that, in the event that the operational condition of the information processing apparatus 10 is "S0", a shift is made to the BIOS mode by issuing the notification command "Interrupt", temporarily shutting down the information processing apparatus 10 which is operating in the OS mode, and reactivating it.

In an embodiment, a description will be given of an example of effectively carrying out a security process by forcibly shifting the information processing apparatus 10 to the BIOS mode.

According to an embodiment, even in the event that the information processing apparatus 10 is in a condition in which it cannot respond, due to a freezing (a hang-up) or the like, it is possible to shut down the information processing apparatus 10.

That is, even in the event that it is not possible to shift the information processing apparatus 10 to the BIOS mode by means of a reactivation, it is possible to carry out a security process effectively.

A block diagram illustrating an outline configuration of a data security system 1c and function according to another embodiment is the same as that in FIG. 13.

Figure 14:
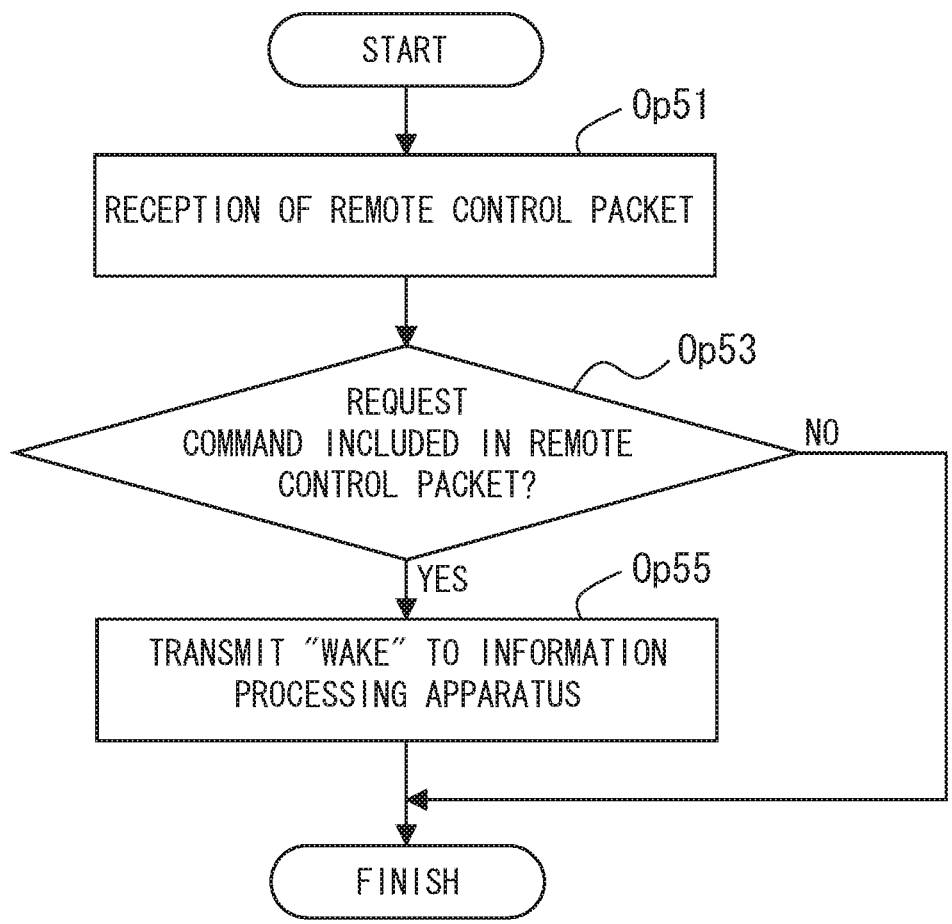
FIG. 14 illustrates an example of an operation of the communication control device in an event of receiving a remote control packet transmitted from a server apparatus.

FIG. 14 is a flowchart illustrating an example of an operation of the communication control device 9 in the event of receiving a remote control packet transmitted from the server apparatus 3. The reception section 43 of the communication control device 9 receives a remote control packet transmitted from the server apparatus 3, via the network N (Operation Op51).

The identification section 44, if a security process request command is included in the remote control packet received in Operation Op51 (Operation Op53: Yes), notifies the notification signal generation section 91 of the fact. For example, a "Lock" command for preventing a third person from using the information processing apparatus 10, and a "Deletion" command for deleting one portion or all of the data recorded in the information processing apparatus 10, exist as security process request commands. Then, these commands are set in advance to be identifiable using a given code value, a given bit string, or the like.

On receiving the notification that a security process request command is included, the notification signal generation section 91 generates a notification signal "Wake" for causing the information processing apparatus 10 to execute a security process, and outputs the generated notification signal "Wake" to the interface section 41 (Operation Op55). Then, the interface section 41 transmits the notification signal "Wake" output from the notification signal generation section 91 to the interface section 24 of the information processing apparatus 10.

Meanwhile, if there is no security process request command included in the remote control packet (Operation Op53: No), the identification section 44 finishes the process of FIG. 14.

Figure 15:
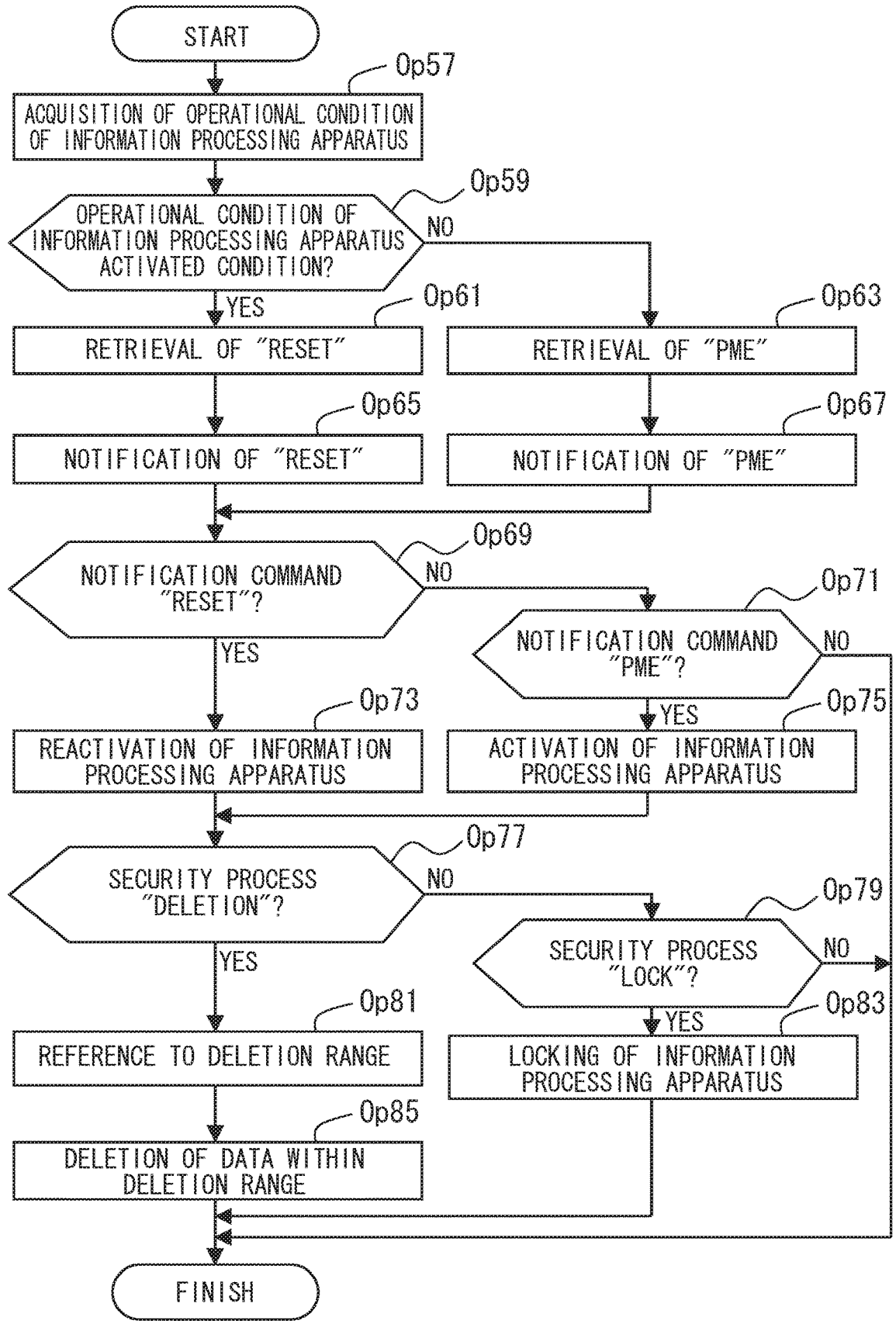
FIG. 15 illustrates an example of an operation of an information processing apparatus in an event of receiving a notification command notified of by a communication control device.

FIG. 15 is a flowchart illustrating an example of an operation of the information processing apparatus 10 in the event of receiving a notification command notified of by the communication control device 9.

The interface section 24 of the information processing apparatus 10 receives the notification signal "Wake" output from the interface section 41 of the communication control device 9.

The interface section 24 outputs the received notification signal "Wake" to the operational condition acquisition section 101.

The operational condition acquisition section 101 which receives the output acquires the current operational condition of the information processing apparatus 10 from the operational condition recording section 102, and notifies the command control section 103 of data indicating the operational condition (Operation Op57).

FIG. 16 is an example of data of the command recording section 104 according to an embodiment.

The indicator "Reset", as a notification command in the event that the operational condition of the information processing apparatus 2 is the activated condition (S0 to S2), and "PME", as a notification command in the event that the operational condition of the information processing apparatus is the standby mode (S3), a hibernate mode (S4), or a shutdown mode (S5), are recorded in the command recording section 104. FIG. 16 also allows for causing an operation with, as a combination, all notification commands as "Reset".

Herein, "Reset" is a command which forcibly reactivates the information processing apparatus 10, regardless of the OS condition.

Also, in the same way as in the heretofore described embodiments, "PME" is a command which shifts the information processing apparatus 10 to the BIOS mode only, without shifting it to the OS mode.

If the operational condition acquired in Operation Op57 (FIG. 15) is the activated condition (Operation Op59: Yes), the command control section 103, on receiving the notification from the operational condition acquisition section 101, retrieves "Reset" from the command recording section 104 (Operation Op61), and notifies the CPU 21 of the retrieved "Reset" (Operation Op65).

Meanwhile, if the operational condition acquired in Operation Op57 is the standby mode, hibernate mode or shutdown mode (Operation Op59: No), the command control section 103 retrieves "PME" from the command recording section 104 (Operation Op63), and notifies the CPU 21 of the retrieved "PME" (Operation Op67).

If the notification command notified of by the command control section 103 is "Reset" (Operation Op69: Yes), the CPU 21, by forcibly reactivating (resetting) the information processing apparatus 10, shifts the information processing apparatus 10 to the BIOS mode (Operation Op73).

In the heretofore described embodiment, the configuration is such that the reactivation is carried out after shutting down the OS, but in an embodiment, the reactivation is carried out without carrying out the shutdown.

By this means, even in the event that the OS is in a freeze condition, or the like, it is possible to shift to the BIOS mode, and effectively carry out a security process.

Meanwhile, if the notification command is not "Reset" (Operation Op69: No), the CPU 21 determines whether or not the notification command is "PME" (Operation Op71). If the notification command is "PME" (Operation Op71: Yes), the CPU 21 activates (starts up) the information processing apparatus 10 in order to put the information processing apparatus 10, which is in the standby mode, hibernate mode, or shutdown mode, into the activated condition (Operation Op75).

In this case, the CPU 21 shifts the information processing apparatus 10 to the BIOS mode only, without shifting it to the OS mode.

Also, the information processing apparatus 10 is equipped in advance with a function which, even in the event that the operational condition of the information processing apparatus is the shutdown mode, receives the notification command "PME", and executes the received "PME".

Meanwhile, if it determines that the notification command is not "PME" (Operation Op71: No), the CPU 21 finishes the process of FIG. 15.

After shifting to the BIOS mode, the security section 23, by referring to the register 105 and deletion range recording section 106, carries out a security process on the data stored in the storage section 22 (Operation Op77 to Operation Op85), as illustrated in the heretofore described embodiments.

Herein, each process of Operation Op77 to Operation Op85 is the same as each process of Operation Op14 to Operation Op18 illustrated in FIG. 7.

In the heretofore described embodiments, a description is given taking each of the functional sections; the reception section 43, identification section 44, and notification signal generation section 91 of the communication control device 9, as well as the operational condition acquisition section 101, and command control section 103 of the information processing apparatus 10, to be realized by a computing device, such as a CPU, included in the information processing apparatus 10 executing a given program, and taking the operational condition acquisition section 101 and command recording section 104 to be embodied by a built-in storage device of the information processing apparatus 10, or by a storage device accessible from the computer.

Then, a configuration is employed such that, in the event that the operational condition of the information processing apparatus 10 is shifted, the CPU 21 of the information processing apparatus 10 records the operational condition after the shift in the operational condition recording section 102.

In a modification example of an embodiment, a configuration is employed such that one portion or all of these functional sections are realized by hardware.

Figure 17:
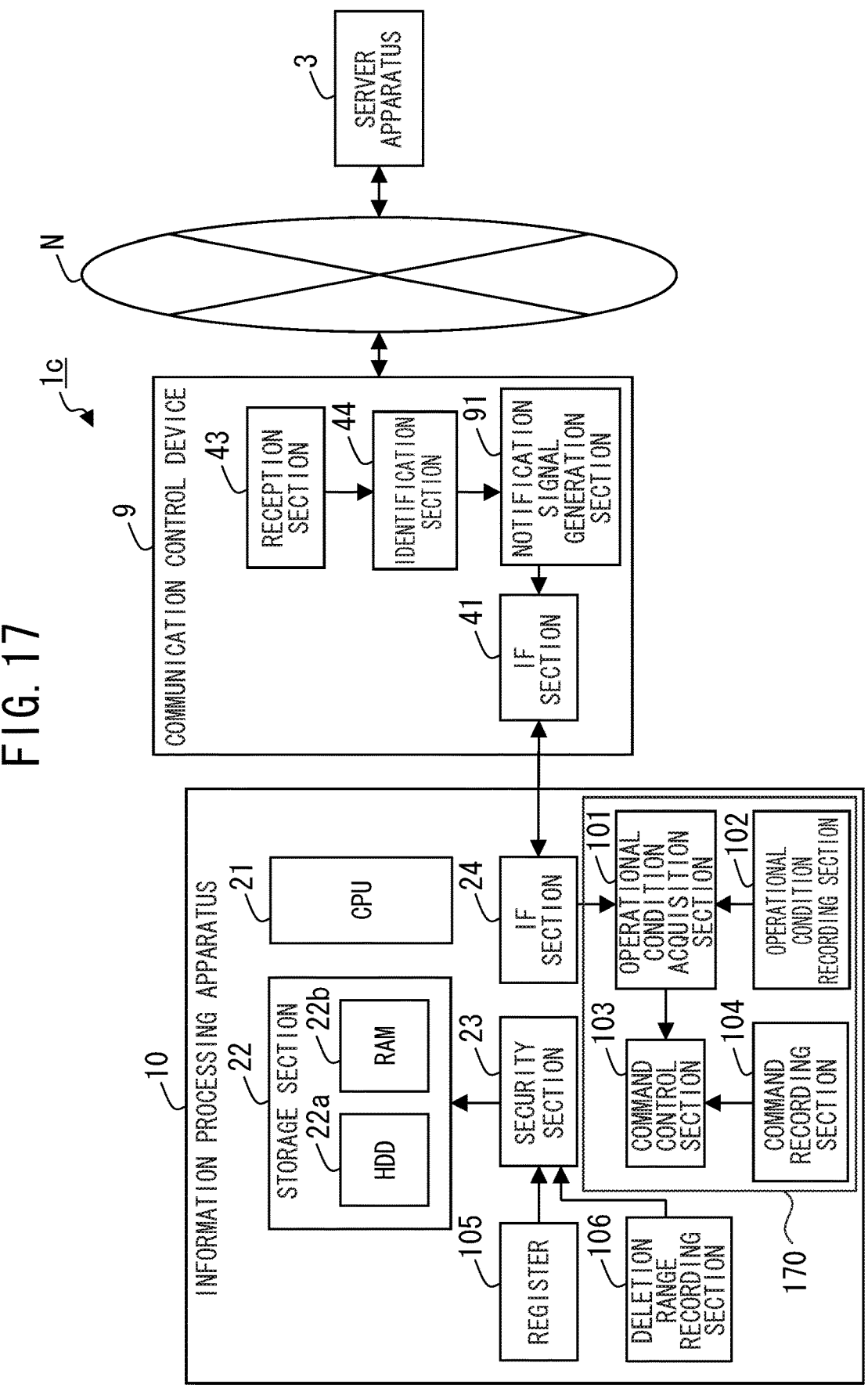
FIG. 17 illustrates an outline configuration of a data security system according to an example of an embodiment of the invention.

For example, as illustrated in FIG. 17, a configuration is employed which uses one piece of hardware 170 including each of the operational condition acquisition section 101, operational condition recording section 102, command control section 103, and command recording section 104 function(s).

According to an embodiment, even in the event that the information processing apparatus 10 is frozen, or the like, it is possible to acquire an accurate operational condition recorded in the hardware 170, and effectively carry out a security process.

As an example of this kind of hardware, a power management unit (PMU) for carrying out a power source management, and the like, exist. By employing a configuration which uses hardware such as the PMU, it no longer being necessary for the CPU 21 of the information processing apparatus 10 to update the operational condition, it is possible, regardless of the operational condition of the information processing apparatus 10, to acquire the accurate operational condition of the information processing apparatus 10 and, based thereon, to effectively carry out a security process.

Specific process details of the hardware 170 are the same as those illustrated in the heretofore described embodiment (FIG. 13 and the like). For example, one operational condition from among "S0" to "S5", prescribed by an advanced configuration and power interface (ACPI), is recorded in the operational condition recording section 102 of the hardware 170.

In at least some of the heretofore described embodiments, a configuration is employed such that the process of determining the notification command ("Interrupt" or "PME") is carried out by the CPU (21, 53, or 71) of the information processing apparatus (2, 5, or 7).

However, if the information processing apparatus 10 is in a condition in which it cannot respond, due to a freezing (a hang-up) or the like, it is not possible to carry out the process of determining the notification command received from the communication control device (4, 6, or 8).

In this kind of case, as subsequent processes are interrupted, it is not possible to effectively carry out a security process.

In an embodiment, bearing in mind this kind of situation, a description will be given of an example wherein a security process is carried out rapidly and effectively by configuring each of the interface sections of the information processing apparatus (2, 5, or 7) and communication control device (4, 6, or 8) as hardware.

Figure 18:
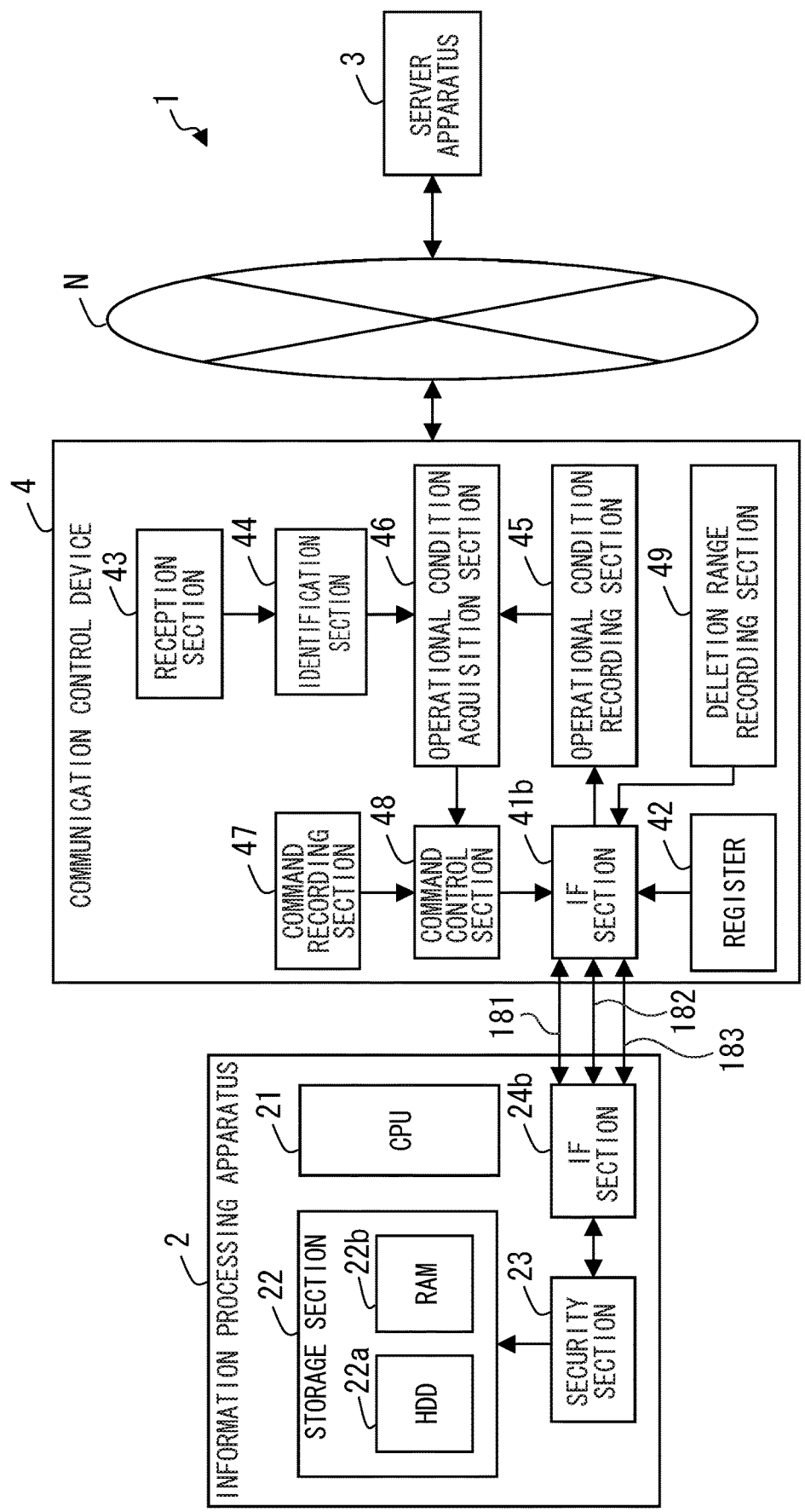
FIG. 18 illustrates an outline configuration of a data security system according to an embodiment of the invention.

FIG. 18 is a block diagram illustrating an outline configuration of the data security system 1 according to an embodiment.

The data security system 1, in the same way as described in embodiment above, includes the information processing apparatus 2, server apparatus 3, and communication control device 4.

Also, in the same way as described in embodiment above, the information processing apparatus 2 includes the CPU 21, recording section 22, security section 23, and an interface (I/F) section 24b, and the communication control device 4 includes an interface (I/F) section 41b, register 42, reception section 43, identification section 44, operational condition recording section 45, operational condition acquisition section 46, command recording section 47, command control section 48, and deletion range recording section 49.

However, in an embodiment, the interface section 24 of the information processing apparatus 2, and the interface section 41 (command notification section) of the communication control device 4, are configured with hardware. As illustrated in FIG. 18, the interface (I/F) section 24b and interface (I/F) section 41b are connected with each other by physical connections (181 to 183).

The number and disposition of the connections is fixed in accordance with specifications, standards, and the like, of the interfaces.

Figure 19:
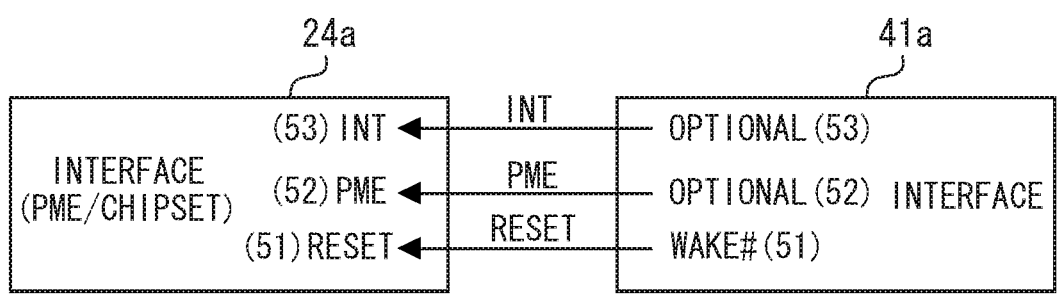
FIG. 19 illustrates a configuration of signal lines in interface section(s) according to an embodiment of the invention.

For example, in the event of using a miniPCI standard, as illustrated in FIG. 19, it is sufficient that a signal line and notification command ("Interrupt", "Reset", or "PME") are correlated in the interface (I/F) section 24b and interface (I/F) section 41b.

In this case, a number 53 pin of the interface (I/F) section 41b and a number 53 pin of the interface (I/F) section 24b are correlated in "Interrupt". Therefore, on a signal being output to the number 53 pin of the interface (I/F) section 41b, the interface (I/F) section 24b can immediately recognize that "Interrupt" has been notified of.

Figure 20:
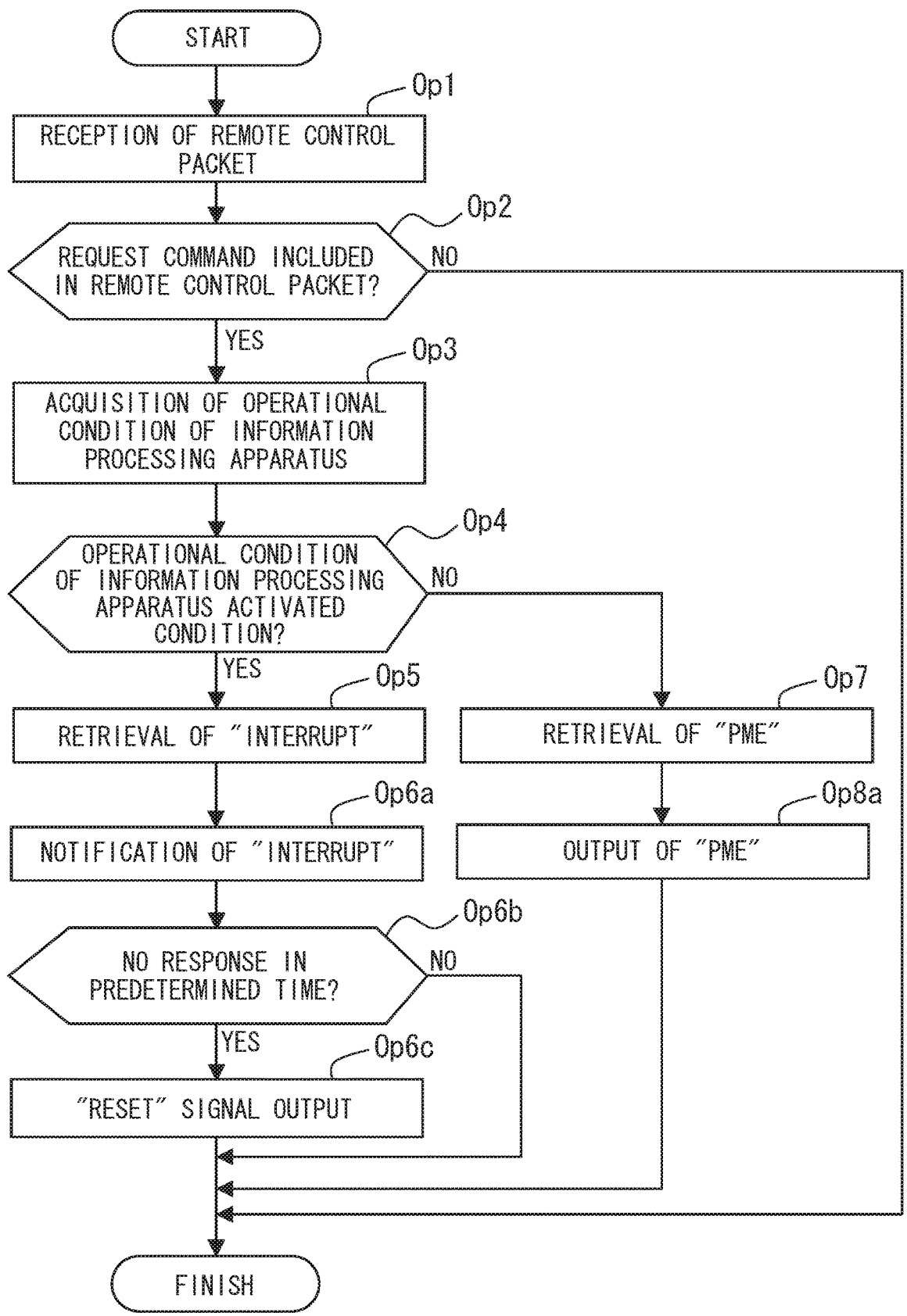
FIG. 20 illustrates an example of an operation of a communication control device in an event of receiving a remote control packet transmitted from a server apparatus.

FIG. 20 is a flowchart illustrating an example of an operation of the communication control device 4 in the event of receiving a remote control packet transmitted from the server apparatus 3.

Each process of Operation Op1 to Operation Op5, and Operation Op7, is the same as each process of Operation Op1 to Operation Op5, and Operation Op7, of FIG. 6 illustrated in the above embodiment.

In Operation Op6a, the command control section 48 outputs the "Interrupt" retrieved from the command recording section 47 to the interface section 41b.

Also, in Operation Op8a, the command control section 48 outputs the "PME" retrieved from the command recording section 47 to the interface section 41b.

On receiving an output, the interface section 41b outputs a given signal to the interface section 24b of the information processing apparatus 2 from a pin number (number 53 or number 52) corresponding to "Interrupt" or "PME".

In the event that there is no response from the information processing apparatus 2, even after a given time elapses, despite the interface section 41b having output the given signal to the information processing apparatus 2 (Operation Op6b), the command control section 48 outputs a "Reset" command to the interface section 41b (Operation Op6c).

On receiving this, the interface section 41b outputs a given signal to the information processing apparatus 2 from a pin number (number 51) corresponding to "Reset".

By this means, the communication control device 4 can appropriately reset the information processing apparatus 2.

Figure 21:
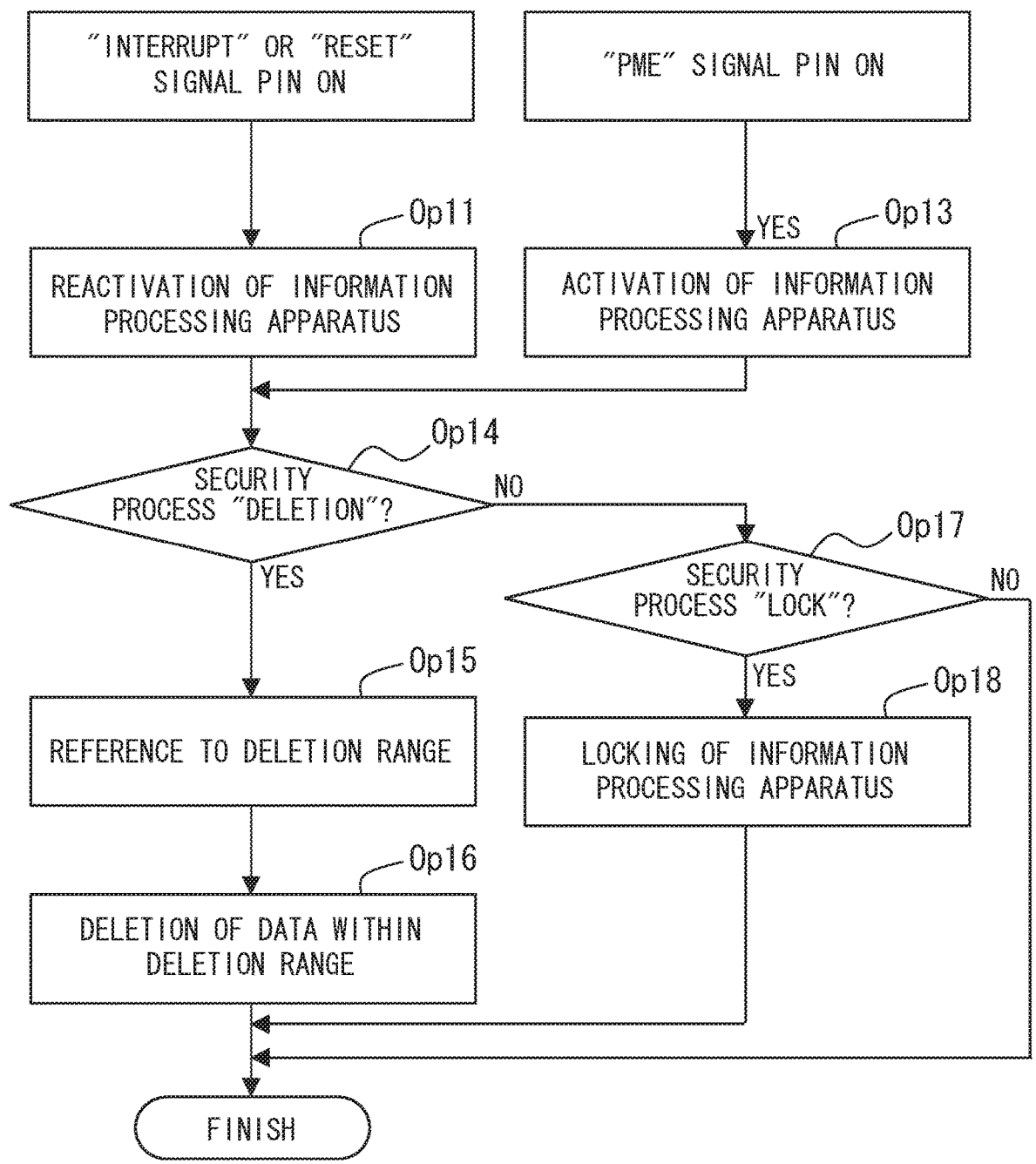
FIG. 21 illustrates an example of an operation of the information processing apparatus in an event of receiving a notification command notified of by a communication control device.

FIG. 21 is a flowchart illustrating an example of an operation of the information processing apparatus 2 in the event of receiving a signal output corresponding to a notification command from the communication control device 4.

Each process of Operation Op11, and Operation Op13 to Operation Op18, is the same as each process of Operation Op11, and Operation Op13 to Operation Op18 illustrated in FIG. 7 according to an embodiment.

For example, in the interface section 24b of the information processing apparatus 2, on receiving a given signal in a pin number (number 53 or number 51) corresponding to "Interrupt" or "Reset", the information processing apparatus 2 is shifted to the BIOS mode by executing Operation Op11 and carrying out a reactivation, while on receiving a given signal in the pin number (number 52) corresponding to "PME", Operation Op13 is executed, and the information processing apparatus 2 is activated in the BIOS mode.

By configuring the interface section 41b of the communication control device 4, and the interface section 24b of the information processing apparatus 2, as hardware, and identifying a command using a given signal output pin number in this way, it becomes unnecessary to carry out the process of determining a notification command ("Interrupt", "Reset", or "PME") received from the communication control device 4 with the CPU 21 of the information processing apparatus 2.

For this reason, the process not being interrupted even in the event that the information processing apparatus 10 is in a condition in which it cannot respond, due to a freezing (a hang-up) or the like, it is possible to carry out a security process rapidly and effectively.

In the heretofore described embodiments, a description is given of the communication control device (4, 6, 8 or 9) with a card type device mountable in a slot of the information processing apparatus (2, 5, 7 or 10) as an example.

In general, this kind of card type device is driven by receiving a power supply from the information processing apparatus, which is a personal computer.

In an embodiment, bearing in mind this kind of situation, a description will be given of a configuration such that a power source section is provided in the communication control device (4, 6, 8, or 9), and a power supply source of the communication control device is switched in accordance with a power supply condition of the information processing apparatus (2, 5, 7 or 10).

Also, a description will be given of a configuration such that, in the event that the communication control device which receives a security command from the server apparatus transmits the command to the information processing apparatus, the command is temporarily recorded in the register in the case of a condition in which no supply of power to the information processing apparatus is being carried out and, after a supply of power to the information processing apparatus is carried out, the command recorded in the register is transmitted.

According to an embodiment, it is possible to avoid a condition in which the supply of power to the communication control device is insufficiently carried out.

Also, in the event that the communication control device which receives a security command from the server apparatus transmits the command to the information processing apparatus, it is possible to cause a security process to be carried out in the information processing apparatus, even in the case of a condition in which no supply of power to the information processing apparatus is being carried out.

Figure 22:
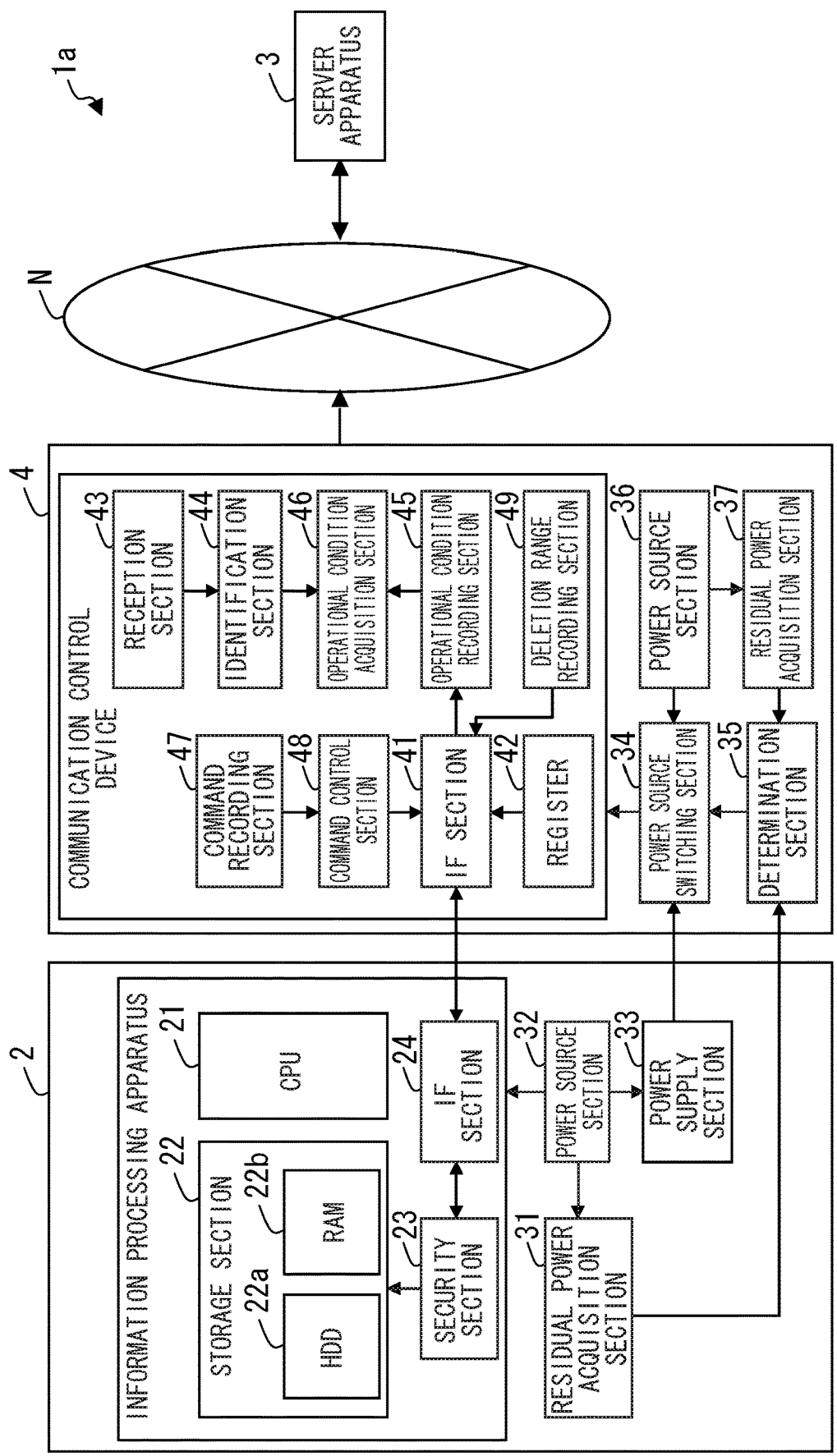
FIG. 22 illustrates an outline configuration of a data security system according to an example of an embodiment of the invention.

FIG. 22 is a block diagram illustrating an outline configuration of a data security system 1d according to an embodiment.

The data security system 1d is basically the same as that illustrated in FIG. 1.

The information processing apparatus 2 includes a power source section 32, a residual power acquisition section 31, and a power supply section 33, which are not particularly illustrated in FIG. 1.

Also, the communication control device 4 includes a power source section 36, a residual power acquisition section 37, a power source switching section 34, and a determination section 35, which are not particularly illustrated in FIG. 1.

In FIG. 22, the same reference numerals and characters are appended to components having the same functions as those in FIG. 1, and a detailed description thereof is omitted.

The power source section 32 of the information processing apparatus 2 carries out a supply of power to each section of the information processing apparatus 2.

The power supply section 33 carries out a supply of power to the communication control device 4, which is an external device.

The residual power acquisition section 31 acquires the residual power from the power source section 32.

For example, in the event that the power source section 32 is a battery compliant with smart battery standards, the residual power is acquired using SMBus protocol.

The power source section 36 of the communication control device 4 carries out a supply of power to each section of the communication control device 4. The residual power acquisition section 37 acquires the residual power from the power source section 36.

The determination section 35, in accordance with the residual power of the information processing apparatus 2, outputs an instruction to the power source switching section 34 switching the power supply source of the communication control device 4.

The power source switching section 34, based on the instruction from the determination section 35, switches the power supply source of the communication control device 4 to the power supply section 33 of the information processing apparatus, or the power source section 36 of the communication control device 4.

Also, the determination section 35, in accordance with the residual power of the information processing apparatus 2, determines whether or not to output a command for a security process to the information processing apparatus 2.

Figure 23:
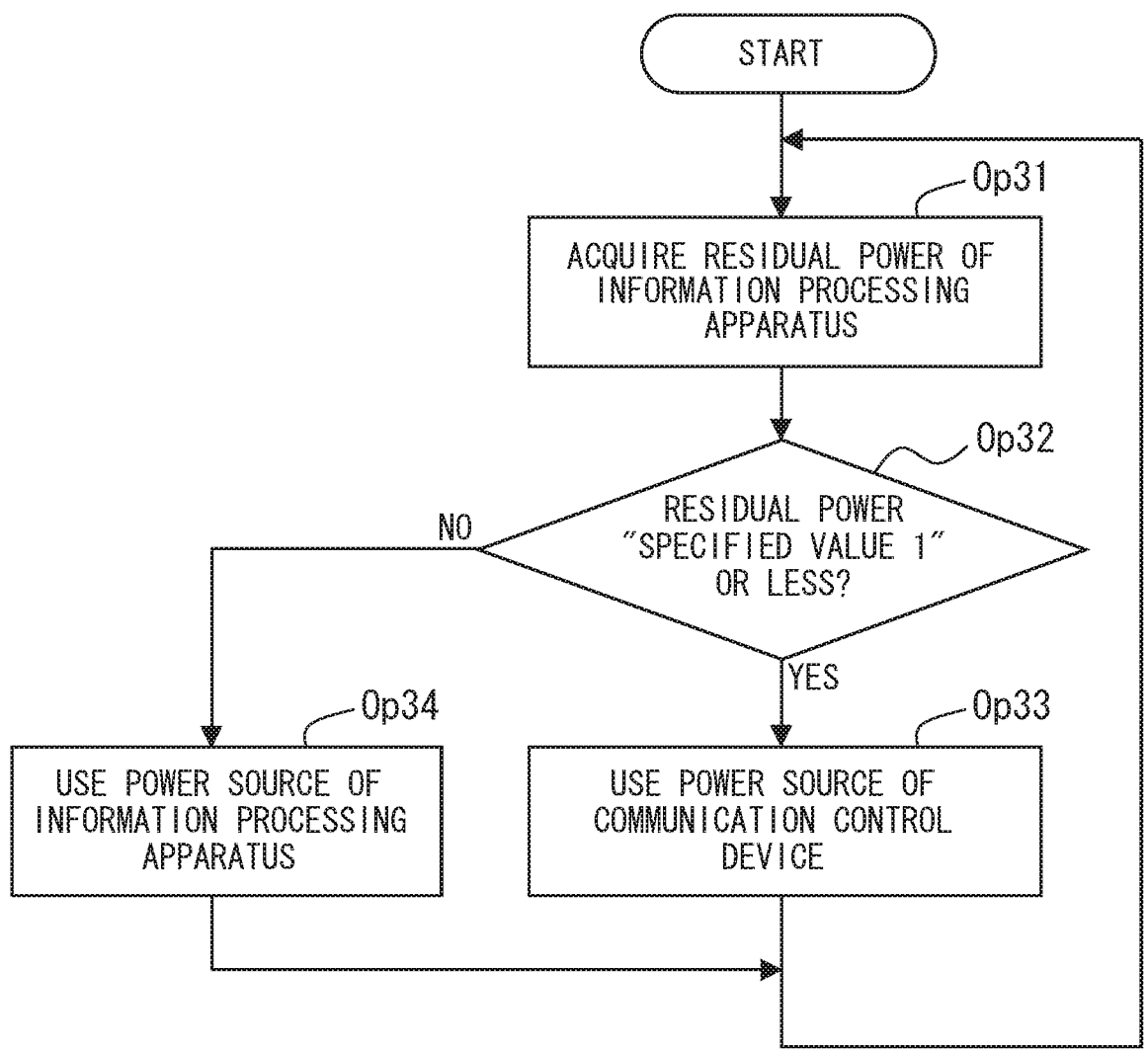
FIG. 23 illustrates an example of an operation of a communication control device in an event of executing a power source switching process.

FIG. 23 is a flowchart illustrating an example of a power source switching process executed by the CPU of the communication control device 4 as the determination section 35.

It is acceptable that the power source switching process is executed regularly, and it is also acceptable that it is resident in the CPU and executed.

The CPU of the communication control device 4 acquires the residual power of the information processing apparatus 2 from the residual power acquisition section 31 of the information processing apparatus 2 (Operation Op31).

If the acquired residual power is a given "specified value 1" or less (Operation Op32: Yes), the CPU, in order to use the power source of the communication control device 4, outputs a switching command to the power source switching section 34 making the power supply section 33 the power supply source (Operation Op33).

Meanwhile, if the acquired residual power is greater than the given "specified value 1" (Operation Op32: No), the CPU, in order to use the power source of the information processing apparatus 2, outputs a switching command to the power source switching section 34 making the power source section 36 the power supply source (Operation Op34).

Figure 24:
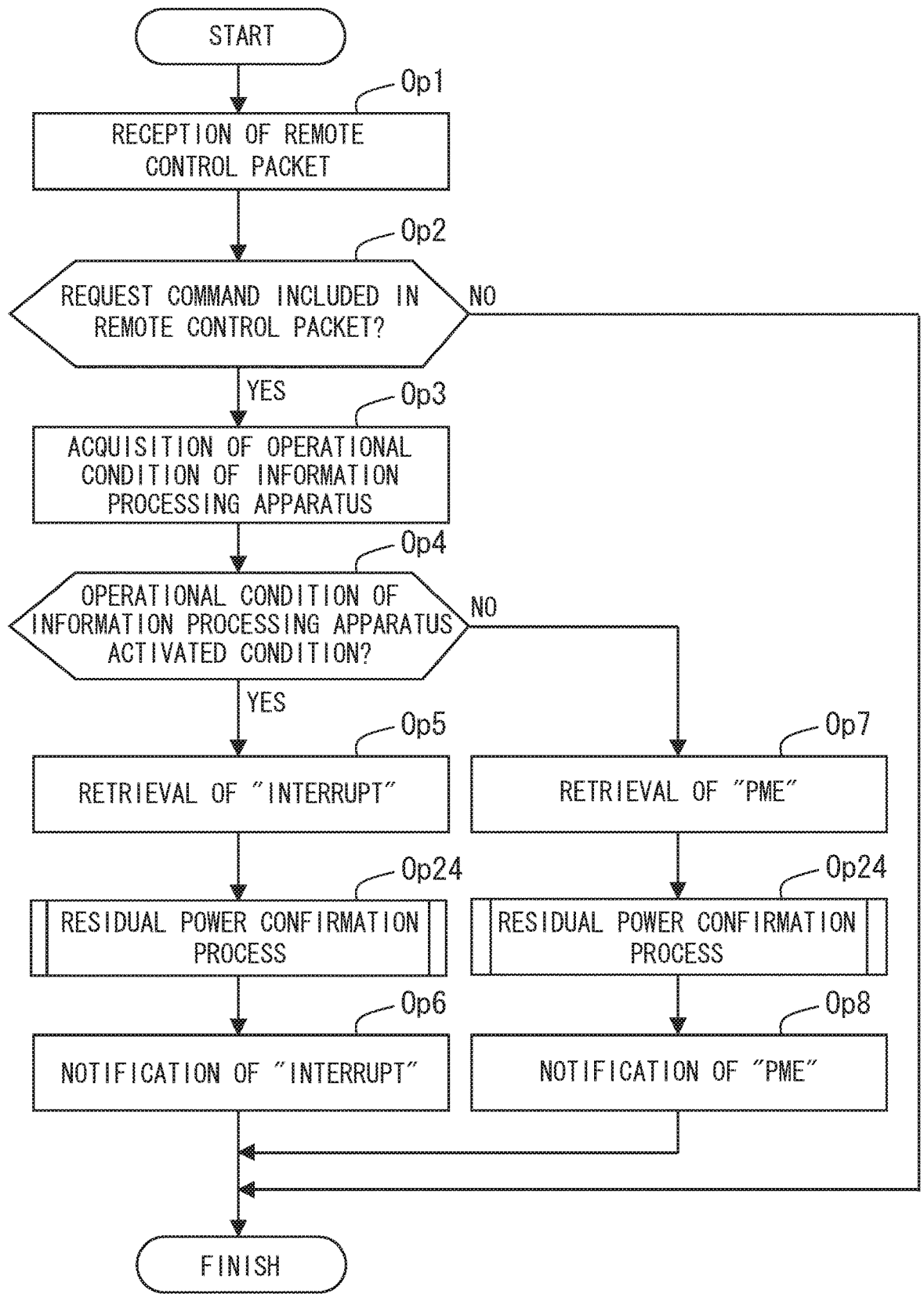
FIG. 24 illustrates an example of an operation of a communication control device in an event of receiving a remote control packet transmitted from a server apparatus.

FIG. 24 is a flowchart illustrating a process executed by the CPU of the communication control device 4, as the determination section 35, in the event of receiving a remote control packet transmitted from the server apparatus 3.

In FIG. 24, the same reference numerals and characters are appended to portions indicating the same processes as those in FIG. 6, and a detailed description thereof is omitted.

Figure 25:
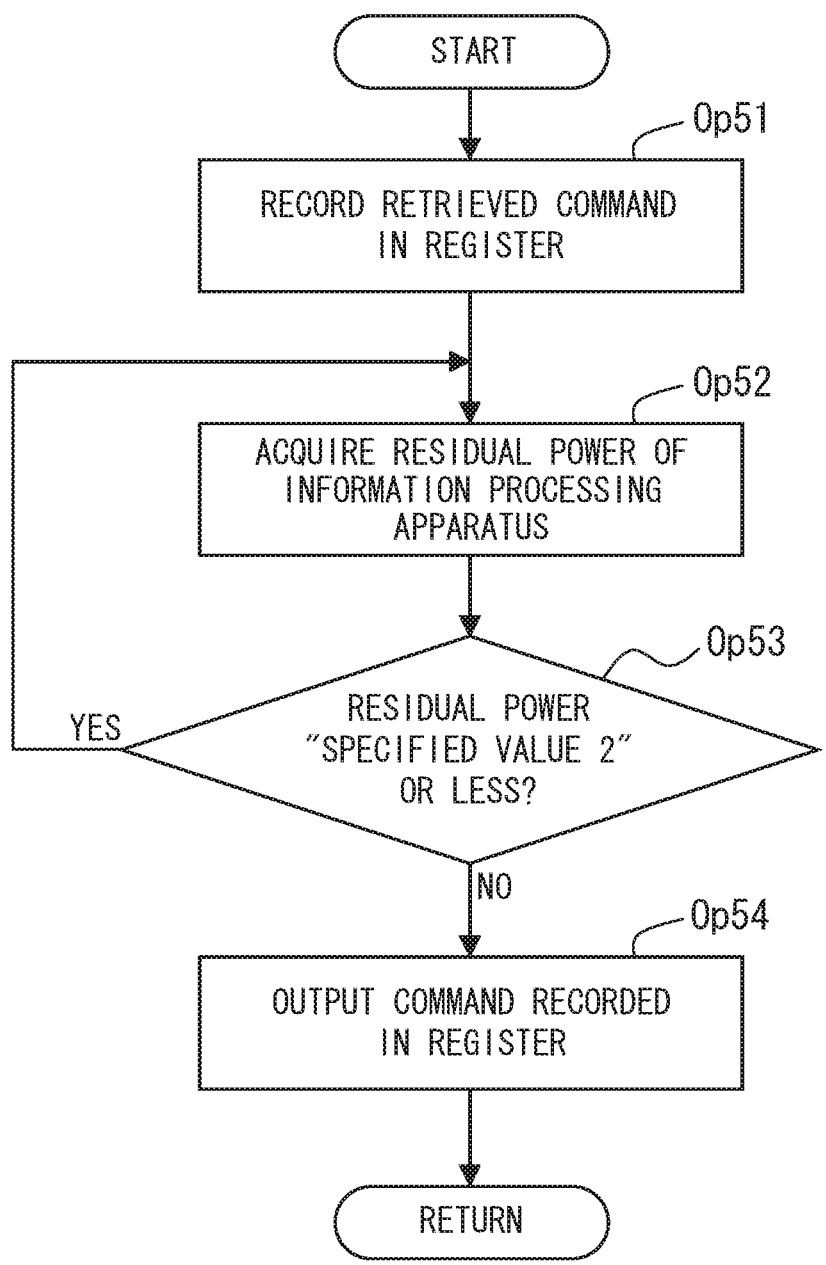
FIG. 25 illustrates an example of an operation of a communication control device in an event of executing a residual power confirmation process.

After Operation Op5 or Operation Op7, the CPU 53 executes a residual power confirmation process (Operation Op24). FIG. 25 illustrates a flowchart of the residual power confirmation process.

The CPU 53 records the command retrieved in Operation Op5 in the register 42 (Operation Op51). Also, it is also acceptable to omit Operation Op52 and Operation Op53.

The CPU 53 acquires the residual power of the information processing apparatus 2 from the residual power acquisition section 31 of the information processing apparatus 2 (Operation Op52).

If the residual power of the information processing apparatus 2 acquired in Operation Op52 is not a "specified value 2" or less (Operation Op53: No), the CPU 53 outputs the command recorded in the register 42 via the interface section 41 (Operation Op54).

Meanwhile, if the residual power of the information processing apparatus 2 is the "specified value 2" or less (Operation Op53: Yes), the CPU 53 returns to Operation Op52, and acquires the residual power of the information processing apparatus 2 again.

By this means, it is possible to hold the command in the register 42 of the communication control device 4, without outputting it to the information processing apparatus 2, until the residual power of the information processing apparatus 2 exceeds the "specified value 2".

According to the above, in the event that the communication control device which receives a security command from the server apparatus transmits the command to the information processing apparatus, it is possible, even in a condition in which no supply of power to the information processing apparatus is being carried out, to detect that the supply of power to the information processing apparatus has been restarted, and to cause a security process to be carried out in the information processing apparatus.

Heretofore, a description has been given of an example of an operation using the given "specified value 1" and "specified value 2", but it is sufficient that values of the "specified value 1" and "specified value 2" are optionally set based on specifications of the information processing apparatus 2. Also, it is acceptable to set the values of the "specified value 1" and "specified value 2" as the same value, and it is also acceptable to set them as individual values.

It is also possible to configure this embodiment in combination with any one of the heretofore described embodiments.

In this case, it is possible to effectively execute a security process, regardless of the power supply condition of the information processing apparatus.

In the heretofore described embodiment, a configuration is adopted such that the power source section 36 and power source switching section 34 are provided in the communication control device 4, but it is also acceptable to adopt a configuration such that the power source section 36 and power source switching section 34 are not provided.

In an embodiment, it is determined by the determination section 35 of the communication control device 4, in accordance with the residual power of the information processing apparatus 2, whether or not to output a command for a security process to the information processing apparatus 2.

Figure 26:
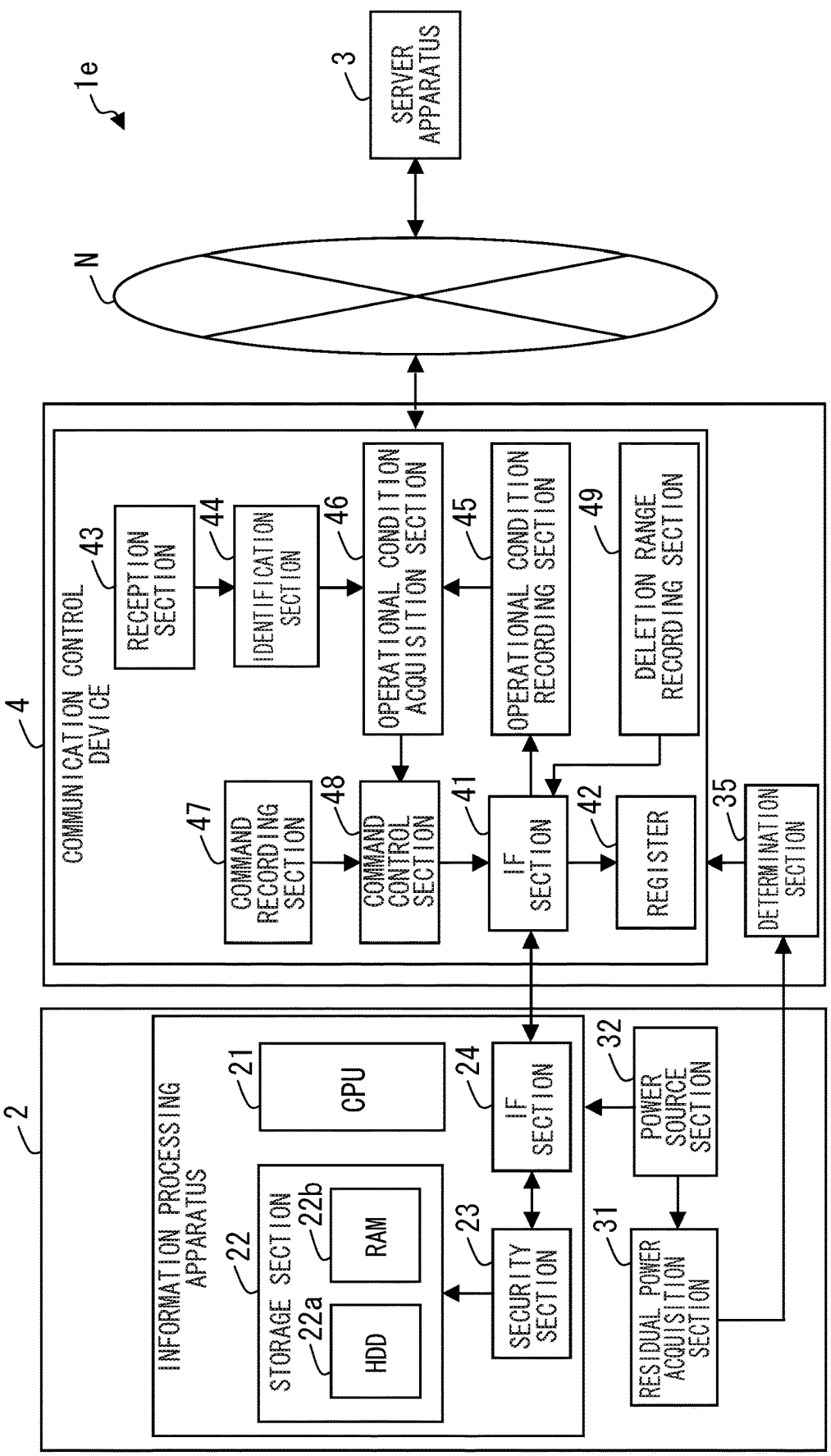
FIG. 26 illustrates an outline configuration of a data security system according to an embodiment of the invention.

FIG. 26 is a block diagram illustrating an outline configuration of a data security system 1e according to an embodiment.

The data security system 1e is basically the same as that illustrated in FIG. 1.

Also, the communication control device 4 does not include the power source section 36, residual power acquisition section 37, or power source switching section 34.

In FIG. 26, the same reference numerals and characters are appended to components having the same functions as those in FIG. 22, and a detailed description thereof is omitted.

The communication control device 4, in the event of receiving a remote control packet transmitted from the server apparatus 3, executes a process the same as that in FIG. 24.

That is, in an event of receiving a remote control packet transmitted from the server apparatus 3, the CPU of the communication control device 4, as the determination section 35, executes the process illustrated in FIG. 24.

According to the above, in the event that the communication control device which receives a security command from the server apparatus transmits a command to the information processing apparatus, it is possible, even in a condition in which no supply of power to the information processing apparatus is being carried out, to detect that the supply of power to the information processing apparatus has been restarted, and to cause a security process to be carried out in the information processing apparatus.

In an embodiment too, it is sufficient that the values of the "specified value 1" and "specified value 2" are optionally set based on the specifications of the information processing apparatus 2, as heretofore described.

Also, it is acceptable to set the values of the "specified value 1" and "specified value 2" as the same value, and it is also acceptable to set them as individual values.

It is also possible to configure an embodiment in combination with any one of the heretofore described Embodiments.

In this case, it is possible to effectively execute a security process, regardless of the power supply condition of the information processing apparatus.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A communication control device configured to access an information processing apparatus in which data is stored, the communication control device comprising:
    a memory, and
    a processor coupled to the memory whereby the processor:
        acquires an operational mode of the information processing apparatus according to an instruction related to a security process, the instruction being received via a network;
        determines whether the acquired operational mode of the information processing apparatus according to the instruction related to the security process is a shutdown mode in which a power source of the information processing apparatus is deactivated; and
        transmits an activation command and a data deletion command to the information processing apparatus in response to the acquired operational mode of the information processing apparatus being determined to be in the shutdown mode,
    wherein:
        the activation command activates one of a Basic Input/Output System (BIOS) or an Extensible Firmware Interface (EFI) of the information processing apparatus, without activating an operating system of the information processing apparatus, and
        the data deletion command is according to the security process controlling the information processing apparatus which performs a data deletion process through the activated BIOS or EFI including deleting at least a portion of the data stored in the information processing apparatus.

2. The communication control device according to claim 1, wherein
    the data deletion process implements the deleting of the at least a portion of the data stored in the information processing apparatus based on a range information which indicates range of data to be deleted by the information processing apparatus.

3. The communication control device according to claim 1, wherein
    the portion of the data includes a cipher key used to encode the data stored in the information processing apparatus, and
    the data deletion process deletes the cipher key stored in the information processing apparatus.

4. The communication control device according to claim 1, wherein the processor is further configured to:
    store the data deletion command and/or the activation command in the memory in a case that a residual power acquired from the information processing apparatus is equal to or less than a given value; and
    transmit the data deletion command and/or the activation command to the information processing apparatus in a case that the residual power exceeds the given value.

5. The communication control device according to claim 4, further comprising:
    a first power source circuit configured to supply power to the communication control device; and
    a power source switch configured to supply power to the communication control device by switching to either a power supply received from a second power source circuit of the information processing apparatus which is configured to supply power to the communication control device, or a power supply received from the first power source circuit;
    wherein the processor is further configured to issue, in an event that the residual power acquired from the information processing apparatus is equal to or less than the given value, an instruction to the power source switch to switch to the power supply received from the first power source circuit.

6. A communication control method for executing processing by a communication control device configured to access an information processing apparatus in which data is stored, the communication control method comprising:
    acquiring, by the communication control device, an operational mode of the information processing apparatus according to an instruction related to a security process, the instruction being received via a network;
    determining whether the acquired operational mode of the information processing apparatus according to the instruction related to the security process is a shutdown mode in which a power source of the information processing apparatus is deactivated; and
    transmitting by the communication control device, an activation command and a data deletion command to the information processing apparatus, the transmitting being in response to the acquired operational mode of the information processing apparatus being determined to be in the shutdown mode,
    wherein:
        the activation command one of a Basic Input/Output System (BIOS) or an Extensible Firmware Interface (EFI) of the information processing apparatus is activated, without activating an operational system of the information processing apparatus, and
        the data deletion command is according to the security process controlling the information processing apparatus which performs a data deletion process through the activated BIOS or EFI including deleting at least a portion of the data stored in the information processing apparatus.

7. The method according to claim 6, wherein
    the data deletion process implements the deletion of the at least a portion of the data stored in the information processing apparatus based on a range information which indicates range of data to be deleted by the information processing apparatus.

8. The method according to claim 7, wherein
the portion of the data includes a cipher key used to encode the data stored in the information processing apparatus, and
the data deletion process deletes the cipher key stored in the information processing apparatus.

9. The method according to claim 6, further comprising:
storing the data deletion command and/or the activation command in a memory in a case that a residual power acquired from the information processing apparatus is equal to or less than a given value; and
transmitting, by the communication control device, the data deletion command and/or the activation command to the information processing apparatus in a case that the residual power exceeds the given value.

10. The method according to claim 9, further comprising:
controlling, by the communication control device, a power source switch to switch a power supply provided for the communication control device from a second power source circuit of the information processing apparatus which is configured to supply power to the communication control device to a first power source circuit which supplies power to the communication control device in a case that the residual power acquired from the information processing apparatus is equal to or less than the given value.

11. A non-transitory computer readable medium having stored therein a program that causes a communication control device to execute a process, the communication control device being configured to access an information processing apparatus in which data is stored, the process comprising:
acquiring an operational mode of the information processing apparatus according to an instruction related to a security process, the instruction being received via a network;
determining whether the acquired operational mode of the information processing apparatus according to the instruction related to the security process is a shutdown mode in which a power source of the information processing apparatus is deactivated; and
transmitting an activation command and a data deletion command to the information processing apparatus in response to the acquired operational mode of the information processing apparatus being determined to be in the shutdown mode,
wherein:
the activation command activates one of a Basic Input/Output System (BIOS) or an Extensible Firmware Interface (EFI) of the information processing apparatus, without activating an operational system of the information processing apparatus,
the data deletion command is according to the security process controlling the information processing apparatus which performs a data deletion process through the activated BIOS or EFI including deleting at least a portion of the data stored in the information processing apparatus.

12. The non-transitory computer readable medium according to claim 11, wherein
the data deletion process implements the deletion of the at least a portion of the data stored in the information processing apparatus based on a range information which indicates range of data to be deleted by the information processing apparatus.

13. The non-transitory computer readable medium according to claim 12, wherein
the portion of the data includes a cipher key used to encode the data stored in the information processing apparatus, and
the data deletion process deletes the cipher key stored in the information processing apparatus.

14. The non-transitory computer readable medium according to claim 11, wherein the process further comprising:
storing the data deletion command and/or the activation command in a memory in a case that a residual power acquired from the information processing apparatus is equal to or less than a given value, and
transmitting the data deletion command and/or the activation command to the information processing apparatus in a case that the residual power exceeds the given value.

15. The non-transitory computer readable medium according to claim 14, wherein the process further comprising:
controlling a power source switch to switch a power supply provided for the communication control device from a second power source circuit of the information processing apparatus which is configured to supply power to the communication control device to a first power source circuit which supplies power to the communication control device in a case that the residual power acquired from the information processing apparatus is equal to or less than the given value.

* * * * *